United States Patent [19]

Debenedictis et al.

[11] Patent Number: 5,625,823
[45] Date of Patent: Apr. 29, 1997

[54] METHOD AND APPARATUS FOR CONTROLLING CONNECTED COMPUTERS WITHOUT PROGRAMMING

[76] Inventors: Erik P. Debenedictis, 204 Canoe Ct., Redwood City, Calif. 94065; Stephen C. Johnson, 144 Melvike Ave., Palo Alto, Calif. 94301

[21] Appl. No.: 730,894

[22] Filed: Oct. 18, 1996

Related U.S. Application Data

[63] Continuation of Ser. No. 278,846, Jul. 22, 1994, abandoned.

[51] Int. Cl.⁶ ........................................................ G06F 9/44
[52] U.S. Cl. .............................. 395/706; 395/670; 395/685
[58] Field of Search ............................................ 395/700, 650, 395/300, 200

[56] References Cited

U.S. PATENT DOCUMENTS

| | | | |
|---|---|---|---|
| 4,333,144 | 6/1982 | Whiteside et al. | 364/200 |
| 4,885,684 | 12/1989 | Austin et al. | 364/300 |
| 5,075,847 | 12/1991 | Fromme | 395/700 |
| 5,265,249 | 11/1993 | Kumamoto | 395/650 |
| 5,276,881 | 1/1994 | Chan et al. | 395/700 |
| 5,301,270 | 4/1994 | Steinberg et al. | 395/161 |

OTHER PUBLICATIONS

Linthicum, David S., "Get the Picture With Visual Programming," Application Development Trends, Feb. 1994.

Dyer, D. Scot, "Visualization: A Dataflow Toolkit for Visualization," IEEE Computer Graphics & Applications, May 1990.

"Breaking the Software Development Bottleneck," AVS/Express, Advanced Visual Systems, Inc., Mar. 1994.

*Primary Examiner*—Kevin A. Kriess
*Assistant Examiner*—Majid A. Banankhah
*Attorney, Agent, or Firm*—Thomas M. Freiburger

[57] ABSTRACT

A process for creating, maintaining, and executing network applications. A user specifies a network application as an interconnection of tasks, each task being addressed to run on one or more computers. Process steps install and execute the application with accommodation for dynamically changing addresses. During execution, process steps compile or interpret source code on remote computers as needed. Process steps permit application changes during execution subject to limitations and fail-safes that prevent non-programmers from creating invalid changes.

13 Claims, 23 Drawing Sheets

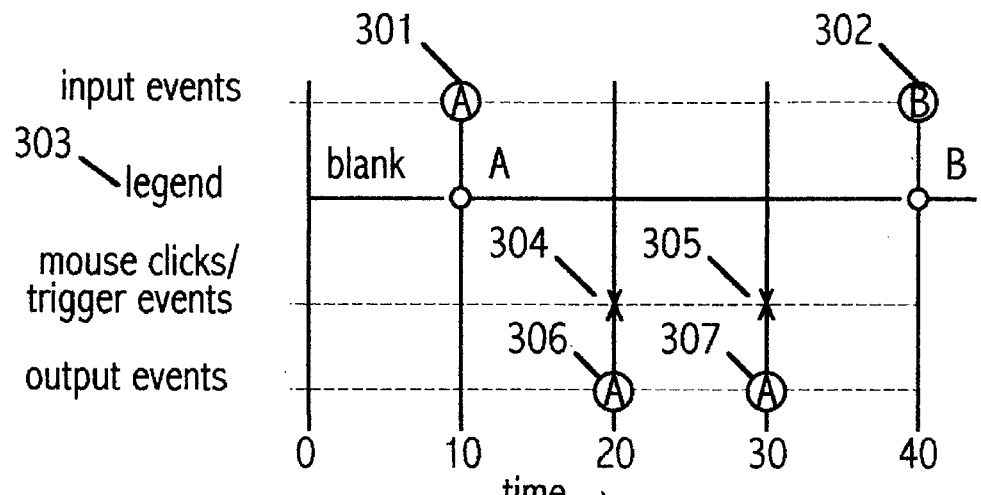

FIG. 3

```
401 ──▶  Console="MyComputer"
         ...

404 ──── Functional {
414 ────   Language = DosBatch;
405 ────   SourceCode = //find $10 $8 > $3//;
406 ────   Address = "Server";
412 ────   Caption="Listing";
411 ────   IconFile="winfile.exe";
417 ────   Class="xyz";
415 ────   Dataparallel = Yes;
416 ────   Asynchronous=Yes;
402 ──▶  }

407 ──── Widget {
408 ────   WindowType=Text;
413 ────   LoadOnce=Yes;
410 ────   Position=(100, 30);
409 ────   GraphicsPosition=(0, 0, 50, 50);
         }
         ...

403 ──▶  Connection {task=1, oclock=3, task=2, oclock=9};
         ...
```

FIG. 4

METHOD AND APPARATUS FOR CONTROLLING CONNECTED COMPUTERS WITHOUT PROGRAMMING

This is a continuation of application Ser. No. 278,846, filed on Jul. 22, 1994 now abandoned.

BACKGROUND OF THE INVENTION

1. Technical Field

This invention relates to computer networks. More particularly, the invention relates to creating, maintaining, and executing application programs for one or more interconnected computers.

2. Description of the Prior Art

In the present state of the art, computer programmers typically link objects to create network applications. Commercial products, such as AVS (Advanced Visual Systems, Waltham, Mass.), apE (TaraVisual Corp., Columbus, Ohio—both described in K. W. Brodlie's book "Scientific Visualization," Springer-Verlag, Berlin Heidelberg, 1992), and Visual AppBuilder (in the AppWare product family from Novell in Provo, Utah) let an operator deposit objects, in the sense of object-oriented programming, onto a program workspace and link the objects in two ways. That is, the operator may draw lines between objects, thus representing the flow of information by messages; and other objects may access data contained in the object through a series of accessibility or scoping rules. A network application results from connecting objects into a diagram that looks and works like a flowchart.

The operator may specify the computer that is to run a particular object. For example, each object in the AVS system has a configuration screen where the operator can specify the name of a computer. The application uses the object on the specified computer when the program runs, conveying data over the network where necessary.

A separate class of tools manage the installation of software on a computer network. A typical installation tool lets the network administrator specify the latest version of application programs on a server. The next time each client computer restarts, for example the next morning when the computer users arrive at work, it checks the specification on the server and updates its files if necessary. These tools install software over a period of hours or days.

The prior art supports field maintenance of applications by shipping the object linking tool to the customer. The better object linking tools hide details about network programming and protocols. The requisite skills for exploiting these details are not normally present outside of professional software organizations. Thus, a user can only use the programming tool in the field to change the objects or their linkage.

No single system incorporates all of the foregoing methods. For example, a user can change the specification of which computer runs a particular object using AVS. However, the program fails if the object is not installed on the newly specified computer. Accordingly, the user has to use a software distribution tool to load the object onto that computer. Hours or days later, the object gets installed and the application runs again.

Spreadsheets let non-programmers set up and maintain applications, but only financial applications. By dropping two programming concepts from its interface (compared to AVS, apE, and Visual AppBuilder), a spreadsheet becomes acceptable to non-programmers. Objects, in the sense of object oriented programming, have both an internal state and a series of methods. To use objects, the operator must imagine the internal state of the computer and how that state is changed by executing methods. This is the same activity a programmer uses when writing instructions for a computer. Spreadsheet cells with constants have state but no method, whereas cells with formulae have a method but no state. As a result, the spreadsheet user need not understand programming concepts such as internal state, methods, and instructions. This makes the spreadsheet paradigm more appealing to non-programmers than the flowchart paradigm. For an explanation of the foregoing, see Rebecca Altman's book "Using 1-2-3 Release 4" (Que Corporation, 1993).

The parallel processing art offers an improvement on the installation process. In the parallel processing art, a programmer creates a single program for a group of computers. As a part of the program's design, only a subset of the statements or subroutines apply to any computer. On the other hand, the program does not need any external program or object to run. Starting a parallel program involves sending the program to all the computers in the group, thus circumventing any installation problem. The parallel processing art uses arcane programming methods, only works for one type of computer at a time, and ignores user interface issues that are very important in the rest of the industry. Additionally, parallel processing is typically concerned with installation across an integrated, interdependent architecture, and not with a network of diverse, independent processing elements. For further information on parallel processing see Michael J. Quinn's book "Parallel Computing: Theory and Practice," McGraw-Hill, New York.

Also of interest is prior art in the area of digital logic simulation on parallel computers. The simulation art uses a network of logic gates and wires as inputs. It simulates time-changing values on wires by events and uses simulation models to compute the behavior of a gate in response to input changes. In the distributed simulation art, each processor simulates gates that apply to its portion of the simulation, and sends events that affect other portions of the simulation to other computers as messages. Sophisticated algorithms determine when to delay a simulated entity because an action taking place concurrently on another computer might change one of its inputs. However, the simulation art has not been applied widely. For further information see D. Jefferson, "Virtual Time," ACM Transactions on Programming Languages, Volume 7, Number 3, July 1985, pp. 404–425; and K. M. Chandy and J. Misra, "Asynchronous Distributed Simulation via a Sequence of Parallel Computations," Communications of the ACM. Volume 24, Number 4, April 1981, pp. 198–206.

SUMMARY OF THE INVENTION

As discussed above, the prior art includes various methods that aid the production and execution of network applications. Unfortunately, these methods do not work together well. One feature of the invention combines the various methods into a single overall method. Only a skilled programmer could use any or all of the methods in the prior art, with the exception of spreadsheets. This is not because the methods are hard to use, i.e. they often run with a single command. Instead, this is because the output of one method must be processed manually to make it compatible with the input of another method. By applying a combined method, the processing that previously required a skilled programmer disappears, leaving only the single command. Thus, this invention forms the basis of products that are suitable for non-programmers.

Another feature of the invention adapts the power made available to non-programmers to forms that they are accustomed to using. Thus, the invention provides at least two new command forms for field application maintenance by non-programmers. One advantage of this feature of the invention is that applications become more maintainable, and therefore more valuable.

The invention provides a method and apparatus that uses a single representation, referred to as an Intertask representation, for all the steps involved in creating and running an application. An Intertask representation is defined to contain a task and a connection. A task describes activities for one or more computers that advance the total application. These activities can include copying files or running existing applications or specific programs. A connection describes the flow of data between tasks. An Intertask representation is not for a specific computer (as a computer program is), but may draw on the resources on any networked computer or other device. An Intertask representation draws upon resources by executing tasks on specific computers or other devices on the network, while the connections move data across the network when necessary.

The invention provides a method that includes a series of steps that apply to an Intertask representation. These steps fall into various groups, for example: The invention provides a system extends spreadsheets to permit a non-programmer to develop non-financial applications. This feature of the invention turns spreadsheet cells into the Intertask representation's tasks to produce non-numerical and time-dependent events. It also lets tasks correspond to User Interface (UI) elements such as push buttons and list boxes. The method of execution changes to accommodate the fact that non-financial applications run in stages, rather than all at once, as with a spreadsheet. This feature of the invention is based on the inventor's insight that spreadsheets' wide success is due to lack of programming and that a spreadsheet methodology can be reapplied to more general applications, and eventually to computer networks.

The system also adapts discrete event simulation algorithms to the job of executing an Intertask representation. Event simulations are often set up as interconnections of components, e.g. networks of computer logic gates, just as with a spreadsheet and an Intertask representation; and event simulations use events similar to those in common UIs. The advantage of this approach on a single computer is that the simulation algorithm handles sophisticated UI timing that normally requires manual programming, thus permitting an Intertask representation set up by a non-programmer to have a sophisticated UI. The advantage of this approach for computer networks is that a distributed, discrete event simulation algorithm produces the protocol required to run an Intertask representation on a network.

The system includes steps that assure that messages are always sent to the correct computer, based upon indirect and potentially dynamic input from the user. The user specifies message flow indirectly by specifying where tasks run. Furthermore, user specifications can be provided, and changed, while the program runs. The user specifications may be transmitted around the network to control the transmission of real data messages asynchronously. The resulting method relies on timing properties of an Intertask representation. Accordingly, intuitively understandable specifications defined by non-programmers reliably produce the entire range of behaviors that is expected from a network application.

The system obviates the installation of network applications. There are a series of steps that run every time one computer contacts another. These steps check to see if the Intertask representation is installed on the contacted computer, and otherwise installs it if necessary. An Intertask representation for an application is identical on all computers, thus allowing any computer to load any other. Two advantages flow from this feature of the invention. First, installation becomes more efficient. Second, running a new program becomes as quick as a issuing command. This enables a new class of commands that operate by changing the Intertask representation, installing it, and running it. These commands give the user the ability to affect the behavior of a program to a degree previously possible only by reprogramming.

The system provides a method that includes a series of steps which permit an Intertask representation to run on computers that have different instruction sets. This is accomplished by providing an Intertask representation containing tasks in instruction set-independent forms. These forms are compiled into the required instruction set when, and only when, needed. Only the Intertask representation requires a strict independence of the instruction set, while arbitrarily complex and instruction-set dependent steps are possible in the interpretation of an Intertask representation.

The system provides two fail-safe methods that allow a non-programmer to change the behavior of an Intertask representation. These methods present the user with an interface showing selected aspects of the Intertask representation and giving one or more options for changing it. Process steps provide a fail-safe by rejecting changes that would create an incorrect program. Application development and maintenance are qualitatively similar but differ by degree. Thus, repackaging a programmer's interface and applying a fail-safe can produce a powerful program maintenance capability.

BRIEF DESCRIPTION OF THE DRAWINGS

FIG. 3 shows the encapsulation of a push-button widget according to the invention;

FIG. 4 illustrates the computer representation of an Intertask representation according to the invention;

DETAILED DESCRIPTION OF THE INVENTION

Figure 1:
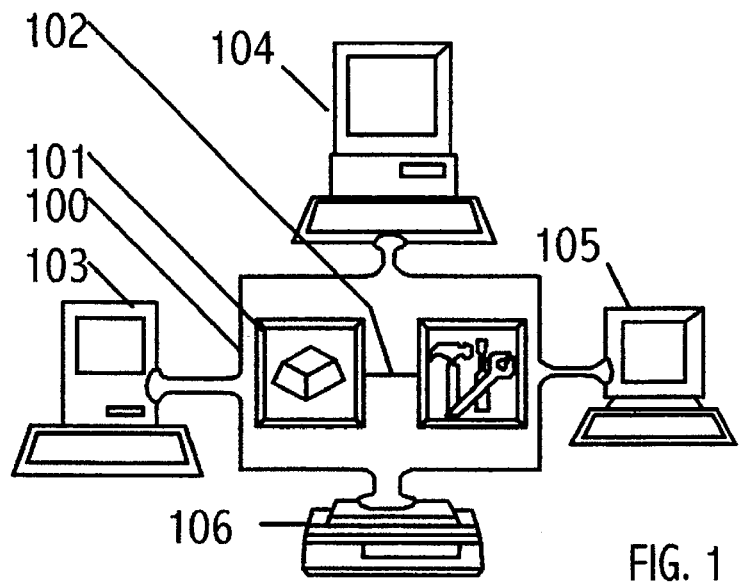
FIG. 1 illustrates an Intertask representation in relationship to a network according to the invention.

FIG. 1 illustrates a representation, which is referred to as an Intertask representation. The Intertask representation 100 is defined to contain a task 101 and a connection 102. A task describes activities for one or more computers that advance the total application. These can include copying files or running existing applications or specific programs. A connection describes the flow of data between tasks. An Intertask representation is not produced for a specific computer, as a computer program is, but may draw on the resources on any networked computer 103–105 or other device 106. An Intertask representation draws upon resources by executing tasks on specific computers or other devices on the network, while the connections move data across the network when necessary. Each task has a series of tie points, each of which is designated for either input or output. Each connection joins one input and one output tie point. A task may contain a program fragment, thus called a functional task, or a task may be associated with an element of a UI, thus called a widget task (following the terminology of X Windows). The program fragment is defined by a data set, referred to as the source code, and an identification of the language of the source code. The type of the source code corresponds to a means for the computer to interpret the data set as a program. Thus, the data set may be, for example source code for a high level language to be compiled or interpreted as a program; a script to run an external program; or a binary or intermediate form to be executed directly. The widget is of any type supported by the operating system as a primitive or supplied by the user. A task with a widget may have additional information that places the widget logically and/or aesthetically in the application's UI.

Connections convey events from the output of one task to the input of another task during execution. Events have a computer data value, being any data supportable by the underlying computer, including for example text, pictures, graphics, sound, and images. Connections may be interpreted as having time-varying values. Under this interpretation, a connection has an undefined value between the time execution begins and the time the first event flows over the connection. At each subsequent time, the value of the connection is the value of the last event flowing over the connection. Events placed at one end of a connection move to the other end without unnecessary delay.

It should be appreciated that the computer data values discussed herein may include continuously varying signals of the form that commonly represent audio or video as alternative forms of time-varying values. Likewise, connections can be extended to both of input and output.

The task fires when a certain combination of events determined by the task's firing policy arrive at the input of a task. The preferred embodiment includes synchronous and asynchronous firing policies, although the invention is readily applicable to other firing policies. The synchronous firing policy requires that every input have an event, whereas the asynchronous firing policy requires that any input have an event.

If a task has a program fragment, firing the task executes the program fragment. This execution removes the input events, making their data values available to the program fragment as inputs, and creates output events with data values from the outputs of the program fragment's execution. If a task has a widget, firing the task loads data into the widget. This execution removes input events and puts their data values into the widget in a manner characteristic of the widget, described below. A task with a widget may trigger as well as fire. Generation of a trigger event, described below, by the widget produces output events with data values derived from the widget by a means described below. The invention may provide asynchronous tasks with notification of which input caused them to fire. This includes the name of the computer that produced the event in a network implementation.

A comparison of the properties of an Intertask representation and a spreadsheet may clarify the operation and unique properties of an Intertask representation. For purposes of this comparison, spreadsheet cells may be analogized to functional tasks; and references to cells in formulas, e.g. A1, B2, may be analogized to connections. When a spreadsheet evaluates a formula, it may subsequently evaluate other formulae that depend on the first, and so forth. Likewise, events produced by evaluating the program fragment in one task may cause other tasks to fire.

However, an Intertask representation has a more general facility than a spreadsheet for accepting input and displaying output. A spreadsheet cell always displays the output of its formula, although they can be hidden, and permits the user to change its contents. A task without a widget never displays anything, but a task with a widget can display output and accept input in the form of any supported widget. A widget affects timing, unlike a spreadsheet cell. Evaluation of a spreadsheet proceeds to completion as quickly as possible, whereas a widget task delays execution pending a trigger event.

An Intertask representation may also be analogized to a computer logic circuit. This allows the use of a computer logic simulator to execute an Intertask representation. Computer logic gates may be analogized to tasks containing program fragments and wires may be analogized to connections. When the output of a computer logic changes, the wire conveys the new value to the inputs of other gates, potentially causing them to change as well. This may be analogized to the output of a task changing and the output events being conveyed to inputs of other tasks. Input/output devices, such as switches and indicator lights, may be analogized to tasks with widgets. The clocking behavior of some logic devices may be analogized to the firing policy in tasks. A clocked register ignores data input changes until a clock change arrives. This may be analogized to a synchronous firing policy which ignores events on one input until events arrive at the others.

The invention gives significance to events that repeat a data value. Many computer simulators cannot represent a wire changing from 0 to 0 because it does not make physical sense. However, the invention is able to represent a push-button that withdraws money from a bank account. If the button gets pressed twice, there should be two debits to the account balance.

The invention may include other steps that provide fault tolerance in the event of computer or network failures. These steps include retaining historical logs of events on a persistent store, such as a disk. The simulation algorithm is then enhanced to rerun a network application based on historical logs of input/output events. The enhancements discard output events that produce events already contained in the historical log.

Widget Tasks

While the invention uses standard widgets, these widgets must be encapsulated to produce data-bearing events with certain timing properties. Widget tasks interpret input events and generate output events in a unique way. Each type of widget task has a characteristic method of interpreting input data to change the appearance of the widget. This method is chosen heuristically to accept the most common forms of data and either display them in the widget in a desirable form or save the data for later output.

Likewise, each type of widget has a characteristic method of determining when external inputs cause a trigger event. The heuristic must avoid creating a trigger event while the user is in the process of a multiple-action input. For example, it must avoid creating triggers after the user types each letter of a word. The trigger must then occur when the user finishes the input. Upon a trigger, each type of widget

TABLE I

Terminology Correspondence With Prior Art
Table I illustrates the correspondences between terminology used herein with that of the prior art.

| Area of current or prior art | Terminology for function | Terminology for connection | Terminology for input/output means |
| --- | --- | --- | --- |
| Intertask representation | Task | Connection | Widget |
| Spreadsheet | Expression in cell | Cell coordinates (A1, B2, etc.) in expression | Visual attributes of cell in printout or display |
| Discrete event simulation | Logic function for gate | Wire | Switch or indicator light |

Illustrative Example

Figure 2:
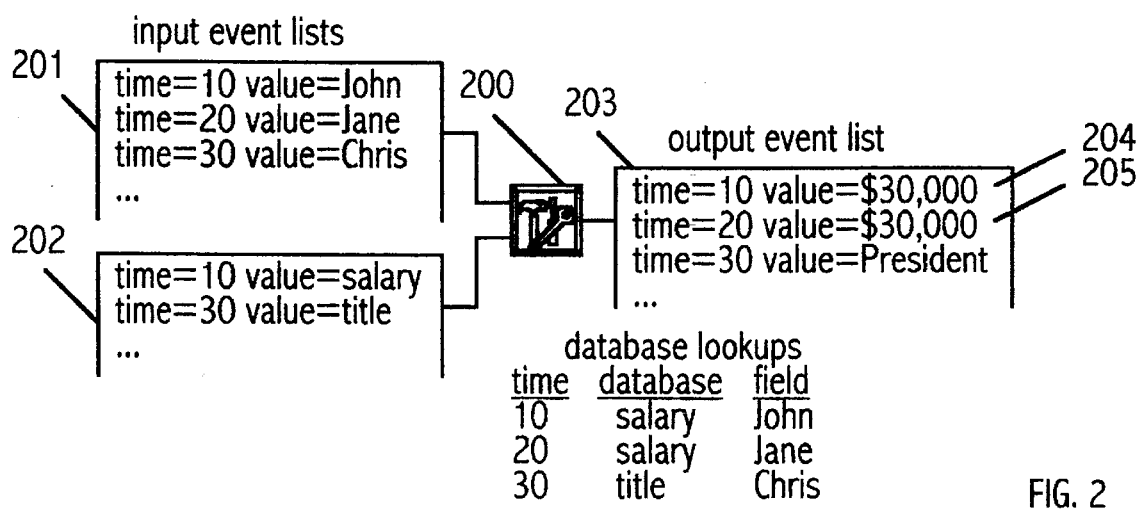
FIG. 2 shows an example of a network application executed by a discrete event simulation.

FIG. 2 illustrates the application of event simulation to a problem outside of computer circuit simulation. The example illustrates terminology and relationship to prior art only and not the ultimate scope of the invention. Task 200 has a query input 201 that gets the series of values "John," "Jane," and "Chris" at times 10, 20, and 30. This could result from the user typing these names on 10 second intervals. The database input 202 gets values "salary" and "title" at times 10 and 30. The computer only stores information about the changes in these values, as shown in the event lists.

The simulation algorithm runs a program that looks up names a database once for every time value in every input list. For the lists shown, this is times 10, 20, and 30. The inputs to the program at each of these times come from the event lists. The value for each input is the latest value in the event list not occurring after the input. Most simulation algorithms, including those that apply to the invention, process event lists incrementally. These event lists are filled-in only to some point in time, 30 in FIG. 2.

The algorithms get called repeatedly, updating the output event list 203 as far as is possible given the incomplete nature of the input event lists. The invention requires a simulation algorithm that differs from computer simulators in its handling of repeating values. Output event list 203 has events at times 10 and 20 (204 and 205) that have the same value. A computer simulator discards event 205 at time 20 since it represents a wire with a constant voltage.

has a characteristic method of applying data to the output event. The criteria for output is to produce output in the form most likely to be used by other parts of the application.

Table II illustrates the heuristics chosen for widgets in the preferred embodiment of the invention. The example shown in this Table is readily extended to other widgets, and may be applied to alternative heuristics for other purposes using the same widgets.

TABLE II

Simulation models for widgets

| Widget | Disposition of input values | Trigger event | Output event value |
| --- | --- | --- | --- |
| Push-button | Legend (when enabled) | Mouse click over button | Last received input value |
| Text box | Data in text box | Loss of focus | Data in text box |
| List box | Lines of data in list box | Loss of focus | Selected list elements |
| Combo box | Lines of data in combo box | Loss of focus | Selected element |
| Bitmap | Bitmap's image | None | None |
| Static text | Text display | None | None |

TABLE II-continued

Simulation models for widgets

| Widget | Disposition of input values | Trigger event | Output event value |
|---|---|---|---|
| State monitor | Displayed in text box plus written to file | Application starts or file changes not due to an input event | Content of file |
| Subroutine | Starts execution of a network application | None | None |

Trigger events must have an associated simulation time to be usable by a discrete event simulation algorithm. Wall-clock time should be sufficient for this purpose, yet the timers in most computers are not precise enough. Some user interface actions generate several events at once whose order is significant. Pressing a button after typing a number, for example, generates a loss-of-focus event for the type-in immediately followed by button-press event. If the computer creates time stamps for both these events within the same "tick" of the computer's internal clock, the time stamps are the same. Subsequent processing by the discrete event simulation algorithm is unable to order the events properly.

The invention includes a step to accommodate to the finite precision of computer's clocks. The additional step adds an integer field to the internal time format of the computer. For the purposes of comparing time values, this integer field is given precision finer than any precision in the basic time format. This field gets set to zero except when the computer attempts to generate multiple time stamps in the same tick of the internal clock. In this case, the field gets incremented for each time stamp. This step guarantees that each time stamp is different and greater than the previous.

A state monitor widget uses a file to store the on-screen content of the widget. When an application with a state monitor widget starts, the on-screen widget gets initialized with the contents of a file. During execution, all changes to the file or widget get immediately reflected in the other. Upon termination, the file is left with the last contents of the widget.

A subroutine widget has a completely different purpose. A subroutine widget has an associated file, similar to a state monitor widget, but is not visible on the screen. When a subroutine widget receives an input event it starts execution of its file as a network application, using the flowchart in FIG. 8. The subroutine widget thus becomes the basis of the Intertask representation's procedural abstraction.

Conditional tasks provide an addition to the functional and widget tasks. These tasks compare input data on the 8 and 10 o'clock positions against each other, or compare the data on the 9 o'clock position against null data. An unsuccessful comparison produces a new type of FALSE value on all outputs. Functional and widget tasks are modified to detect the new FALSE value on any input and immediately respond with the same FALSE values on all outputs. Options are available to reverse the sense of the conditional. This gives effective conditional operation consistent with the connection-oriented network nature of the invention.

Example of Widget Encapsulation and Timing

The following describes an exemplary encapsulation of a push-button widget to explain timing, data, and widget encapsulation terminology. The example is for illustration only and should not be interpreted as defining the scope of the invention.

A widget task for a push-button shows an image of a push-button on the screen when the application runs. The push-button includes a legend on its face and gets pushed by clicking the mouse over the image. A push-button widget produces many events, e.g. an event corresponding to the mouse moving over the button without being pressed, an event corresponding to each mouse button being pressed over the button, the same for button release, and others. Most of these events are useful only for managing the appearance of the button graphic. Operation of the application at a larger level only needs to know when the user presses the button. In the preferred embodiment, only pressing the left button over the graphic causes a trigger event. Through a similar reasoning, the exemplary embodiment of the invention transfers the data conveyed by input events to the button's legend and associates the last received data with the data portion of the trigger event.

FIG. 3 illustrates the event timing and push-button encapsulation. The diagram shows time-varying values in the form of an oscilloscope trace. Events 301 and 302 arrive at the inputs at times 10 and 30 carrying data values A and B. Trace 303 shows the displayed legend, which is the same as the input viewed as a time-varying signal. Trace 303 uses a mathematical notation to show open- and closed-ended intervals. The legend is blank, corresponding to an undefined value, prior to time 10 because no event has been received. The legend changes to the value in event 301 in the interval $10 \leq t < 40$, and to the value in event 302 for $40 \leq t$.

Assume the user presses the mouse button over the button graphic at times 20 and 40, generating UI events 304 and 305. The last received data value from trace 303 gets combined with UI events 304 and 305 to produce output events 306 and 307.

Representation in a Computer

FIG. 4 illustrates the storage and transmission of an Intertask representation, such as storage in a disk file or the memory of a computer, and transmission over a network. FIG. 4 includes guidelines to show how the representation is divided into sections, each of which may grow. Header section 401 specifies parameters that apply to the entire application. The single parameter illustrated determines which computer receives certain input and output. The ellipsis stands for other parameters introduced later.

Task section 402 specifies a list of tasks. A keyword such as "Functional" or "Widget" introduces each task and defines its type. Parameters that appear within the braces apply to that task only. Task 404 performs a lookup. Source code 405 uses symbols $8, $10, and $3 to represent the tie points of the task. Each of these symbols represents the name of a file containing data in a computer command. The ellipsis represents other tasks in the application.

Connection section 403 specifies a list of connections between tasks. Each entry specifies the endpoints of the two connections through the ordinal number of a task and a connection position. The ellipsis represents other connections. The Intertask representation described above is augmented by storage used when the application is run, but not necessarily persistent. For each task, the non-persistent storage is shown in Table III.

TABLE III

Non-persistent storage locations associated with each task

| Name | Type | Description | Initial Value |
| --- | --- | --- | --- |
| StaticAddress | List of addresses | List of addresses controlling where the task executes | Address specifier 406 (or 401 if 406 is blank) |
| Connections | Array of 12 pointers to connections (described below) | Connections for each of the 12 connection points | Connection specifier 403 |
| program handle | Cached program handle for task. | How to execute the task if already loaded | Empty |

Each connection requires the non-persistent storage locations described in Table IV.

TABLE IV

Non-persistent data associated with each connection

| Name | Type | Description | Initial Value |
| --- | --- | --- | --- |
| StaticTarget | List of computer addresses | Tasks needing connection's data | Empty |
| DynamicTarget | List of connections | Connections conveying data of computers needing connection's data | Empty |
| Sent | Associative array of values YES and NO, indexed by a word | Whether data has been sent to indexing address's computer | NO |
| Data | Associative array of computer data values, indexed by a word | Data received from indexing address's computer | Empty |
| New | Associative array of values UNDEFINED, NEW, and OLD, indexed by a word | Whether data from indexing address's computer is new or has been processed already | UNDEFINED |
| Writer | Pointer to task | Tasks writing data to the connection | Connection specifier 403 |
| Reader | Pointer to task | Tasks reading data from the connection | Connection specifier 403 |

Applications are stored in the form shown in FIG. 4. Before the Intertask representation starts executing, the additional storage locations in Tables III and IV are allocated and filled with the initial values described in the Tables. The steps of the exemplary process then operate to change the initial values over the course of an application's execution.

Executing an Application with a GUI

The process steps in the invention can either be applied to a multitasking computer or to a discrete event simulation system. Specifically, three of the blocks the in FIG. 5 refer to Table V. If the code in Table V's basic column occupies the corresponding blocks in FIG. 5, the result is an implementation for a simple multitasking computer. This implementation works for simpler applications, yet some complex GUI constructs and network failures can confuse the system. If the code in FIG. 5's discrete event column were used instead, arbitrarily complex applications run as well.

Figure 5:
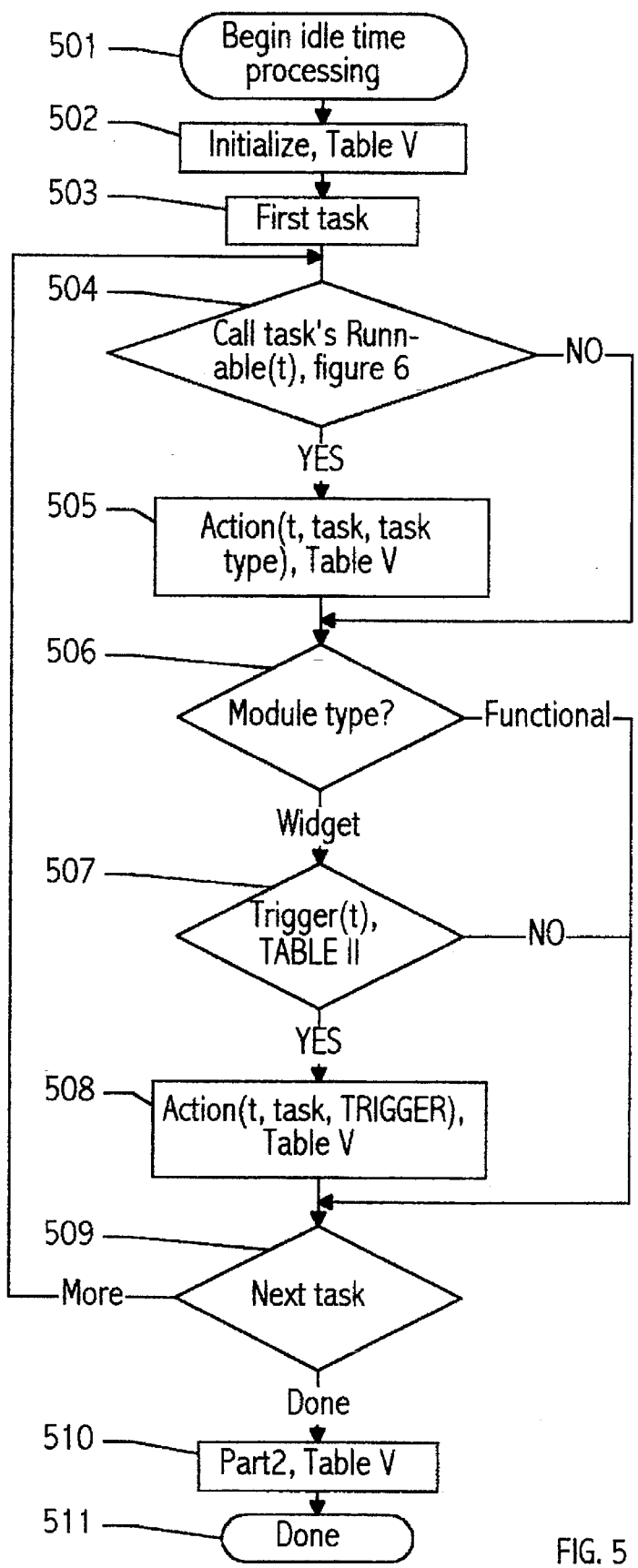
FIG. 5 shows a flowchart showing main loop that executes an application according to the invention.

FIG. 5 shows the process for executing an application with a GUI. The underlying computer includes a facility for computing and high and low priorities, i.e. where low priority refers to idle time. The process in FIG. 5 executes during idle time.

Control enters at block 501 with no arguments. Block 502 performs the initialization shown in Table V. Block 503 starts a loop over all the tasks in the network application. Conditional 504 determines if the task is ready for execution by executing the process in FIG. 6. If FIG. 5 is being used as part of a simulation, argument t is changed to a time value by the process in FIG. 6, otherwise t is irrelevant.

Block 505 executes only if the task is runnable. Block 505 either executes the task or queues the task for future execution, as determined by Table V. Conditional 506 branches based on whether the task has a second action that needs checking. Widget tasks can execute due to either an event input or the user typing on the widget. Widget tasks proceed to conditional 507. Conditional 507 checks for a pending trigger condition for the task by the method in Table II. A trigger is reset once detected by conditional 507.

Block 508 executes only if a widget task has satisfied the trigger condition. Block 508 either transfers user input to outputs or queues this event depending on Table V. Conditional 509 advances to the next task, if any. Task 510 executes the code in Table V.

If FIG. 5 is being used as part of a simulation, the code in Table V selects for execution only a task whose execution maintains the consistency of simulation time. If FIG. 5 is not part of a simulation, 510 does nothing.

Block 511 returns the computer to idle processing. Typically, the computer executes the idle time processing of other jobs and then returns to block 501.

TABLE V

Figure 13:
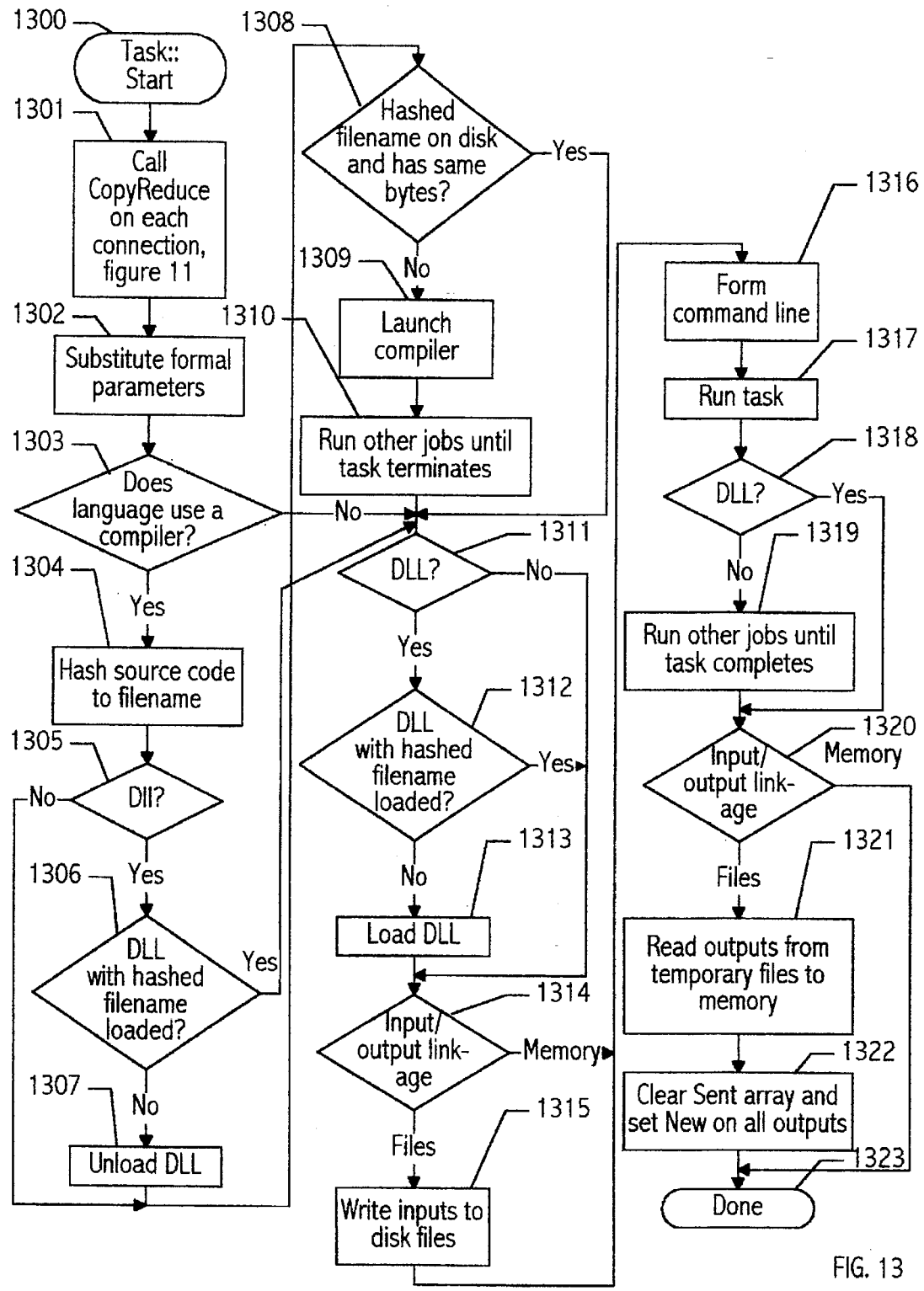
FIG. 13 shows a helper process to prepare a task for execution according to the invention.

| | Task execution criterion | |
|---|---|---|
| Block in FIG. 5 | Basic Method | Discrete Event Method |
| 502 (Initialize) | (ignored) | FireTime = infinity |
| 505 & 508 (Action(Time, task, type)) | if (type == TRIGGER) transfer screen to output else if (functional(task)) Start task, FIG. 13 else transfer input to screen | if (Time < FireTime) { FireTime = Time; FireTask = task; FireType = type; } |
| 510 (Part2) | (ignored) | if (Time ! = infinity) { if (type == TRIGGER) transfer screen to output else if (functional(FireTask)) Start task, FIG. 13 else transfer input to screen } |

Table V shows both how the invention applies to the known art in multitasking operating systems as well as discrete event simulation. The basic column in Table V executes tasks in an order closely approximating the wall-clock time at which they had inputs available for that execution. The queues in graphical operating systems execute tasks in the order events get entered into the queue. The discrete event column in Table V includes process steps that reorder task execution to match simulation time rather than wall clock time. The two orderings differ when a program receives inputs faster than the computer can process them. The discrete event ordering is capable of holding the second input while completing processing of the first. The basic ordering would process the second concurrently or interleaved with the first. Other discrete event simulation algorithms may choose a task other than the earliest for execution or may decline to execute any task pending the result of tasks executing on other computers. FIG. 13 is described fully below. At this point, it can be assumed to (1) set the New field of all data used by the task to OLD, (2) run the task, and (3) set the New field of all data created by the task to NEW.

FIG. 5 and Table V show only one form of discrete event simulation. The invention is applicable to various forms of event simulation, including distributed event simulation.

Figure 6:
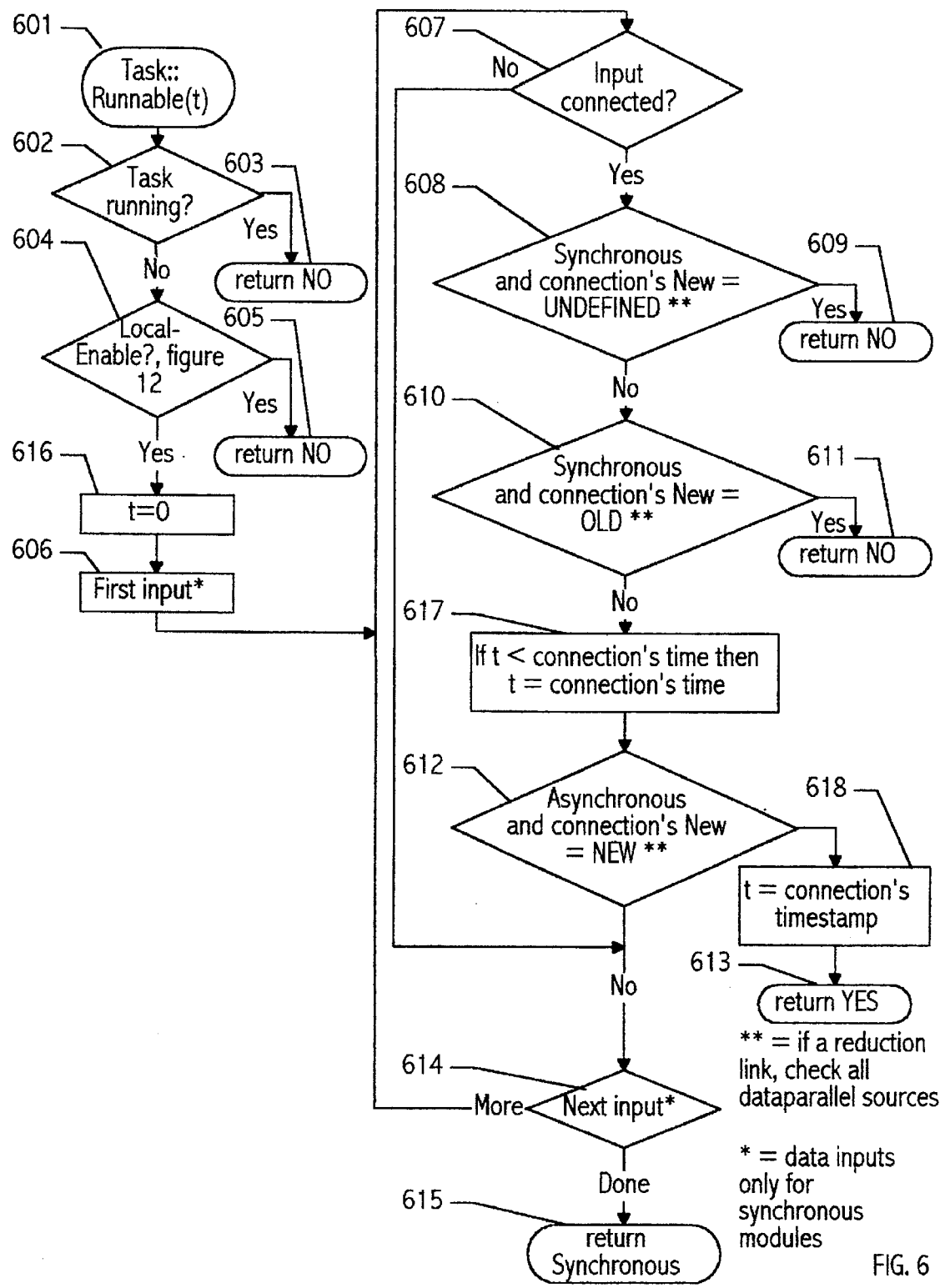
FIG. 6 shows a helper process for input ready according to the invention.

The helper process in FIG. 6 determines that a task is ready to execute. Control enters at block 601 with implicit access to a task, i.e. the flowchart has access to data in one task 402 and the variables in Table III. Conditional 602 checks to see if a task is already running for this task. If so, block 603 returns NO indicating that task cannot be run more than once at a time. Conditional 604 uses the process described in FIG. 12 to determine if the task has been enabled for the current computer. At this point in the explanation, 604 can be assumed to always return YES. If the task is not enabled, block 605 returns NO.

Block 616 sets the returned time variable t to zero. This variable is used for computing the effective firing time of the task. Block 606 begins a loop over the input positions of the task. This loop excludes the address input if the task is synchronous otherwise it includes all inputs. However, this distinction is ineffective at this point because there are no address inputs.

If conditional 607 determines that there is no connection to this input, the process advances to the next input. If the task is synchronous, all inputs must exist and be new for the task to be runnable. Conditional 608 checks the New cell in the connection as defined by Table IV. If New is UNDEFINED, block 609 returns NO for execution not possible. Conditional 610 likewise checks for tasks with data that has already been used as an input to the task and causes block 611 to return NO for execution not possible. If the task is asynchronous, the task should be executed whenever any input is new. Block 617 increases the returned time value to the connection's time if it was less. Conditional 612 tests for a new input. If so, block 618 sets the returned time value to this time and block 613 returns YES. Conditional 614 advances to the next input.

Completion of the loop has a different meaning for synchronous and asynchronous tasks. A synchronous task completes the loop when no task indicates that the task cannot be executed. Block 615 returns YES in this case indicating the task can be executed. On the other hand, an asynchronous loop completes when no input is new and the task should not execute. Block 615 returns NO in this case.

Extension to Networks

As mentioned, the invention is also intended to be extended to computer networks. This is done by associating an address with each task. The address causes a functional task to execute, and a widget task to become visible, only on addressed computers. This is implemented by loading an Intertask representation onto several computers. Specifically, each computer loads the Intertask representation shown in FIG. 4 and initializes the additional variables shown in Tables III and IV.

Thus, each computer starts out with the same Intertask representation in terms of tasks, connections, and so forth, although each computer has a separate copy. When process steps described below change an Intertask representation, the change applies only to the single computer making the change. Intertask representation's are linked into a single application by moving events between the Data entries of a connection, per Table IV, on two computers. Because each computer receives connections from the same Intertask representation, they can match a connection on one computer with that on another, e.g. by the ordinal number of the connection in the connection section 403.

A communication fabric must connect computers that wish to communicate with one another. This may be, for example, a backplane of a parallel computer, an Ethernet or FDDI or ATM network, a traditional or cellular telephone system, direct radio or infrared connections, or other technology. These technologies use addresses to select a computer for communications. These addresses may consist of Ethernet or Internet addresses, telephone numbers, radio frequencies, or other identification, and possibly information to authenticate the originating computer. The term address is used herein without regard to the particular technology that connects the computers or the particular format of addresses. It is also assumed that if a computer sends a second computer the address of a third computer, the second computer can communicate with the third computer if required.

Static and Dynamic Addresses

There are two important cases when addressing tasks. The first is when a task's address is specified in the Intertask representation. This is referred to as the static address case, and it is specified by an address 406. The second case is where the address gets computed as the application runs. This is referred to as the dynamic address case, and it is specified by a connection entering the task on an address input.

Scalar and Data parallel Addresses

Another property of tasks is whether they may run simultaneously on multiple computers or are inherently limited to running on a single computer. This first type of task is referred to as a data parallel task, while the second type of task is referred to as a scalar task.

A property is also associated with the connection that describes how the input data, potentially from multiple writers, is distributed to multiple readers. There are many possible transformations that might be applied here. In the exemplary embodiment of the invention, only a few simple transformations are supported. For example: output from a scalar task is replicated to each data parallel readers; output from a group of data parallel tasks get concatenated to a single value for a scalar reader; output from a data parallel task to another data parallel task is copied on a computer-by-computer basis, provided that the computer address is identical for the reading task and the writing task.

Scalar and data parallel tasks interpret addresses differently. A data parallel task interprets an address as a list of zero or more computer addresses. The task runs on each computer in the list. The exemplary embodiment of the invention creates the list from the first word on each line of the address. A scalar task interprets an address to always yield exactly one computer address. The exemplary embodiment of the invention uses the first word in the address as this computer's address. If the address does not have a first word, i.e. the address is blank, then the value of the Console parameter 401 gets used instead.

The invention also includes passing data to a task on the address input. The steps in the process herein described disregard the portion of each line of an address beyond the first word. This area is used to encode data specifically for the addressed computer.

Preparatory Steps

Sending data to a statically addressed task is straightforward because the static address specification is a part of the Intertask representation. Since the Intertask representation is present on every computer, the name of the destination computer can be looked up in local memory. If the receiving task is dynamically addressed, the destination computer's address is not part of the Intertask representation but is computed at run time by a controlling task. If the controlling task is on a different computer, knowing the address requires message transmission. The controlling task might itself be dynamically addressed, such that the sending computer not only lacks an address for where to send its data, but it doesn't even know where to get the address. The following method precomputes a set of addresses for each connection. Sending data to all these addresses ensures that data and addresses are available in local memory everywhere that they are needed.

The method involves building the two lists called StaticTarget and DynamicTarget for each connection. The StaticTarget is a list of computer addresses. The DynamicTarget is a list of connections. Both lists initially are empty. Moreover, when an address or connection is added, respectively, to these lists, the system checks to make sure that it is not already on the list, so no address or connection, respectively, appears on any such list more than once. This method involves repeating a number of steps, each of which adds to the StaticTarget or DynamicTarget lists, until there are no further changes to these lists. Each step has the form: "whenever X then Y," where X is a pattern that applies to the tasks and connections, and Y is an action that adds to the StaticTarget or DynamicTarget list.

The first set of rules apply to all connections C connecting an output on task U to an input on task V, where task V is statically addressed, and all computer addresses X in the static address list of V:

1. Add X to the StaticTarget list of C.
2. If U is data parallel, V is scalar, and D is a connection giving a dynamic address for U, then add X to the StaticTarget list of D. The next pair of rules apply to all connections C connecting an output on task U to an input on task V, where task V has a dynamic address provided by connection B:
3. Add B to the DynamicTarget list of C.
4. If U is data parallel, V is scalar, and D is a connection giving a dynamic address for U, then add B to the DynamicTarget list of D.

The last two rules apply to situations where C connects an output on task U to an input on task V, and connection D is in the DynamicTarget of C.

5. If X is in the static target list of U, then add X to the StaticTarget list of D.
6. If connection E delivers a dynamic address for U, then add E to the DynamicTarget list of E.

Illegal programs are possible. For example, two tasks, each computing where the other does its computation. Neither task can start until the other finishes, creating a deadlock. These cycles can be detected by analysis of the graph prior to execution.

Data Transmission

Figure 7:
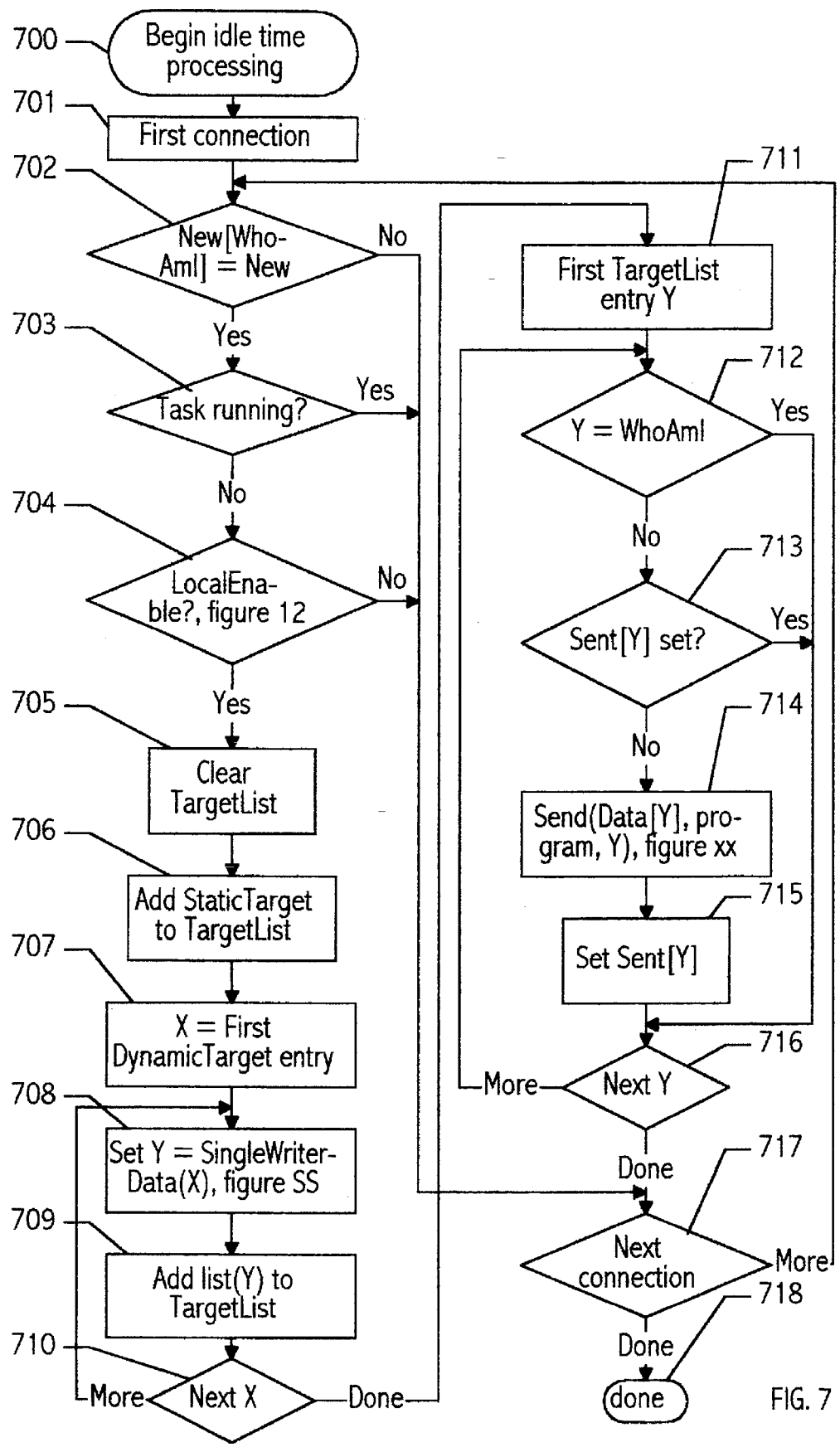
FIG. 7 shows a data transmission guided by pre-computed addresses according to the invention.

The idle-time process described in FIG. 7 manages transmission of data around the network. The process sends locally-produced data to other computers based on both static and dynamic addresses. Note that this process augments the one in FIG. 5.

Control enters at block 700 during the system's idle time processing. Block 701 begins a loop over all the connections in the Intertask representation. If conditional 702 determines that the task sending to the connection has not run yet, there is no data to output and the process advances to the next connection. If conditional 703 determines that the task sending to the connection has a task running, output should be delayed until it completes and the process advances to the next connection.

Figure 12:
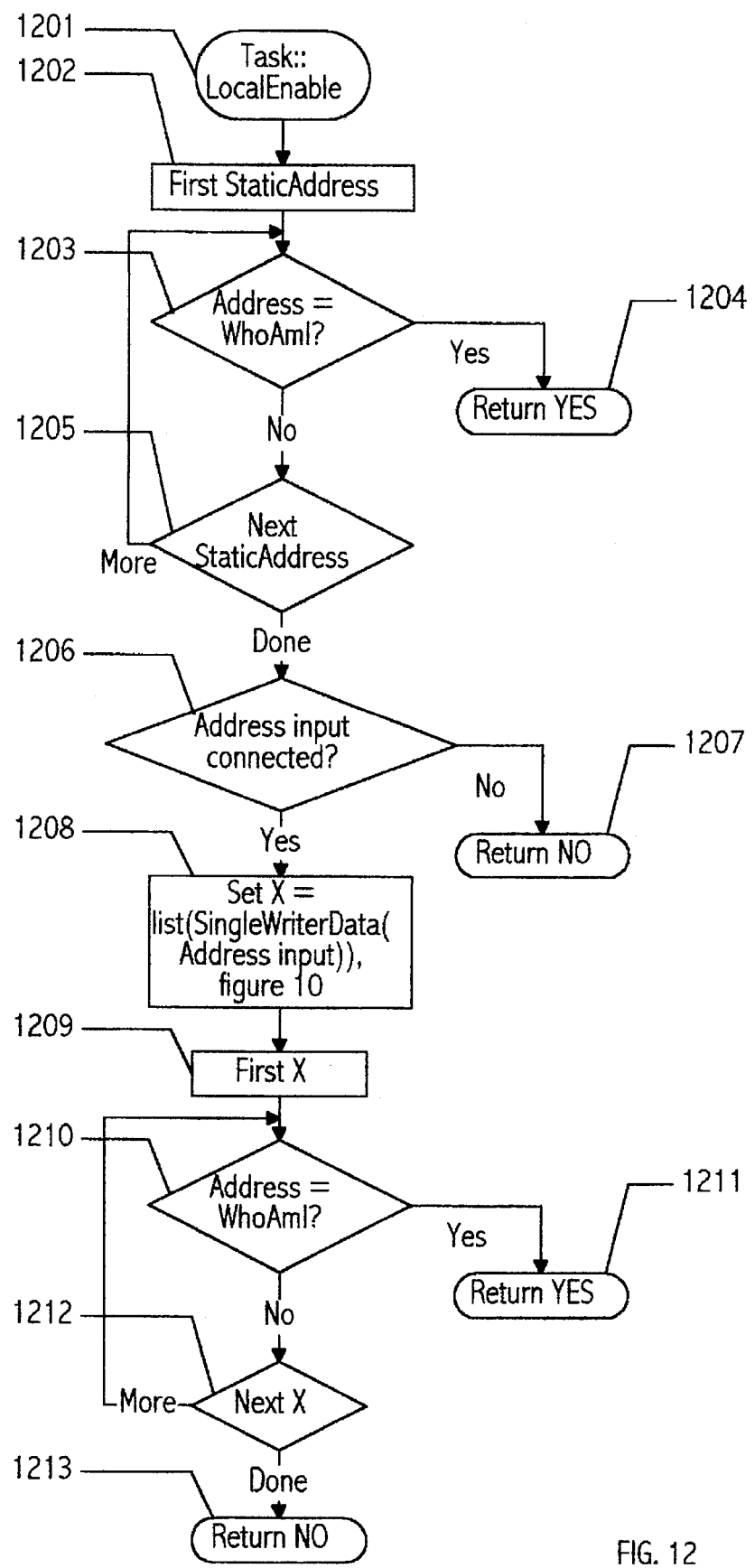
FIG. 12 shows a helper process that determines if a task is enabled on the local computer according to the invention.

Conditional 704 uses the process in FIG. 12 to determine if the task sending to the connection is enabled on the currently executing computer. If not, the process advances to the next connection. Block 705 clears a variable TargetList that eventually gets a list of the computers that should receive output. Block 706 adds the entire StaticTarget list to variable TargetList. Block 707 designates variable X as the first entry in the DynamicTarget list. Block 708 uses connection X as an argument to the SingleWriterData process in FIG. 10 and designates the result Y. This process gets data output by a controlling task indicating where the data should be sent.

Block 709 parses this data into a list of computer names, and adds the whole list of names to the TargetList variable. Conditional 710 advances to the next connection in the DynamicTarget set. At this point the TargetList variable represents the set of computers that need the connection's output data.

Block 711 starts a loop on the entries of the TargetList variable using Y as the controlled variable. Conditional 712 checks to see if Y is the currently executing computer and skips because transmission to one's self is not necessary. Conditional 713 checks associative array Sent in the connection to see if this data has already been sent to Y. If so, control passes to the next computer name. Block 714 sends the data using the process in FIG. 8. Block 715 notes this transmission in the Sent variable. Conditional 716 advances to the next computer name and conditional 717 advances to the next connection.

The process completes at block 718.

Automatic Installation

As mentioned above, the invention installs an Intertask representation on a remote computer immediately prior to its first use on that computer. Because a computer only sends data to another in accordance with instructions in the Intertask representation, the sending computer always has the Intertask representation. If the receiving computer does not have the Intertask representation necessary to process received data, it can get it from the sending computer.

Consider the following example. The user changes a task in an application, effectively creating a new application. The application has a type-in box allowing the user to type the name of a computer. The output of the text box then addresses some task. If the computer is connected to a global computer network, any one of a million computers might need to execute the addressed task. How can the changed Intertask representation get to these millions of computers? Broadcasting every change to millions of computers is inefficient. The process described below gives the same effect, but with low overhead.

The process involves a protocol. The protocol accomplishes two objectives: it transfers the Intertask representation when necessary, and it transfers data always. This does not preclude sending the Intertask representation more often than necessary. Determining whether sending the Intertask representation is necessary requires sending an identification of the Intertask representation and awaiting a reply indicating whether or not an Intertask representation matching the identification is present. The protocol may be enhanced by caching information on the state of remote computers.

Figure 8:
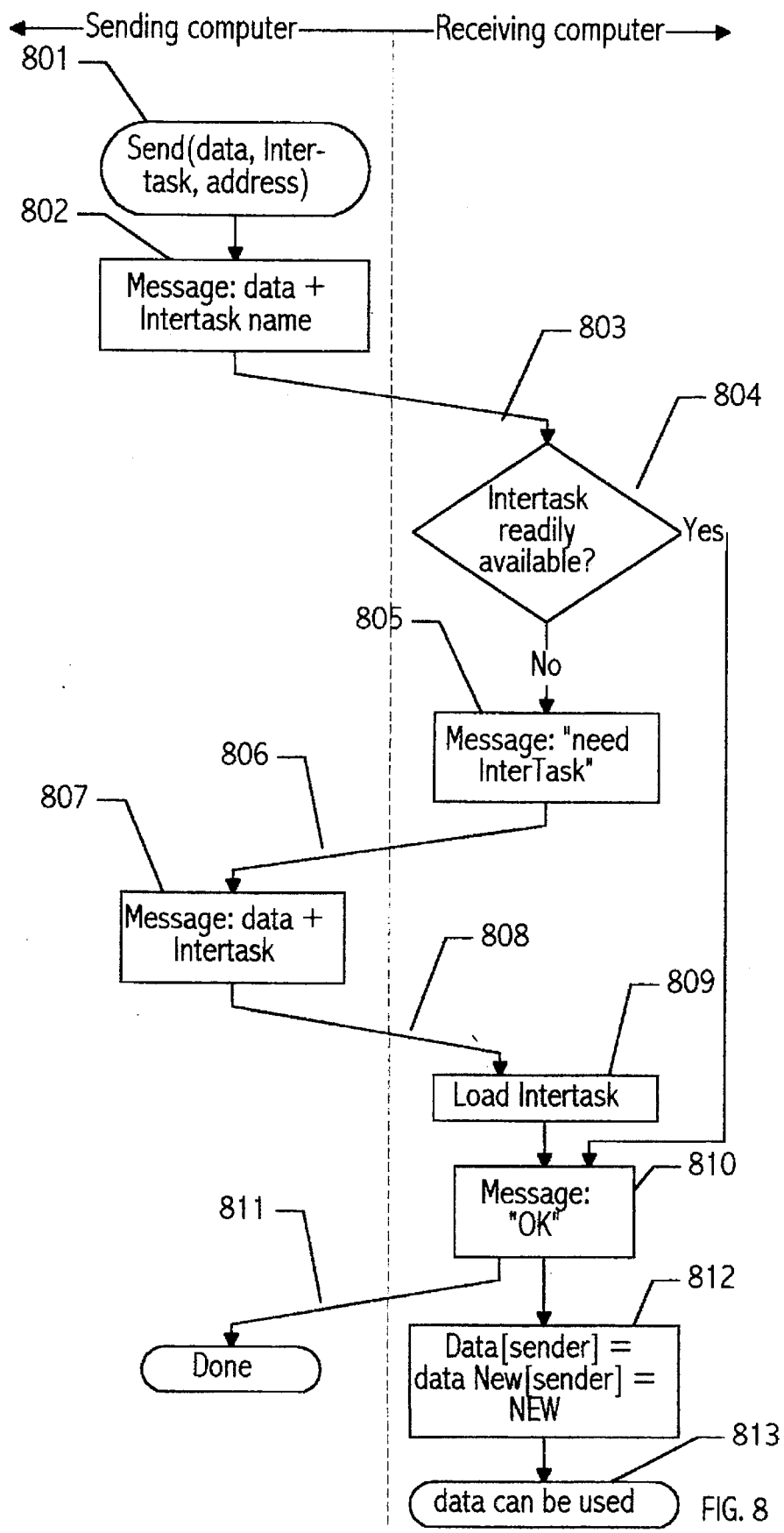
FIG. 8 shows a message protocol assuring automatic installation according to the invention.

FIG. 8 illustrates the preferred protocol for sending data between computers. This protocol is invoked by block 714. Loading is a side-effect of data transmission. Control enters at block 801 executing on the sending computer.

The protocol takes a computer data value, an Intertask representation, and a destination address as arguments. Block 802 sends message 803 to the receiving computer consisting of the data and an identification of the Intertask representation, but not the Intertask representation itself. This identification could consist of the application's name and a version number. Conditional 804 checks to see if the specified version of the named application is readily available. If not, block 805 sends a "need Intertask representation" message 806 back to the sending computer and discards the data portion of the message.

Block 807 responds by resending the data but with the Intertask representation, e.g. message 808. Block 809 on the receiving computer loads the Intertask representation. Block 810 sends an "OK" message 811, ending the process on the sending computer. Block 812 on the receiving computer stores the data in the connection data structure and sets the New variable. The associative arrays are indexed by the address of the sender. Block 813 ends the process on the receiving computer. Control returns to the operating system.

The Intertask representation sent over the network is shown in FIG. 4. Console parameter 401 gets special handling. Console parameter 401 is irrelevant when the Intertask representation is not running. When an application starts, Console parameter 401 gets set to the computer where the user typed the start command. Transfers of the Intertask representation over the network during execution include Console parameter 401. This lets an application interact with a single operator easily.

The automatic installation procedure is preferably used in conjunction with the network's security system. A user can be given access to a remote computer for the purpose of running their own applications. This access gives that user's applications the same capabilities on the remote computer that the user would have if they connected manually. Alternatively, an application can be designated as trustworthy. This lets any user invoke the application remotely.

Helper Processes

Figure 9:
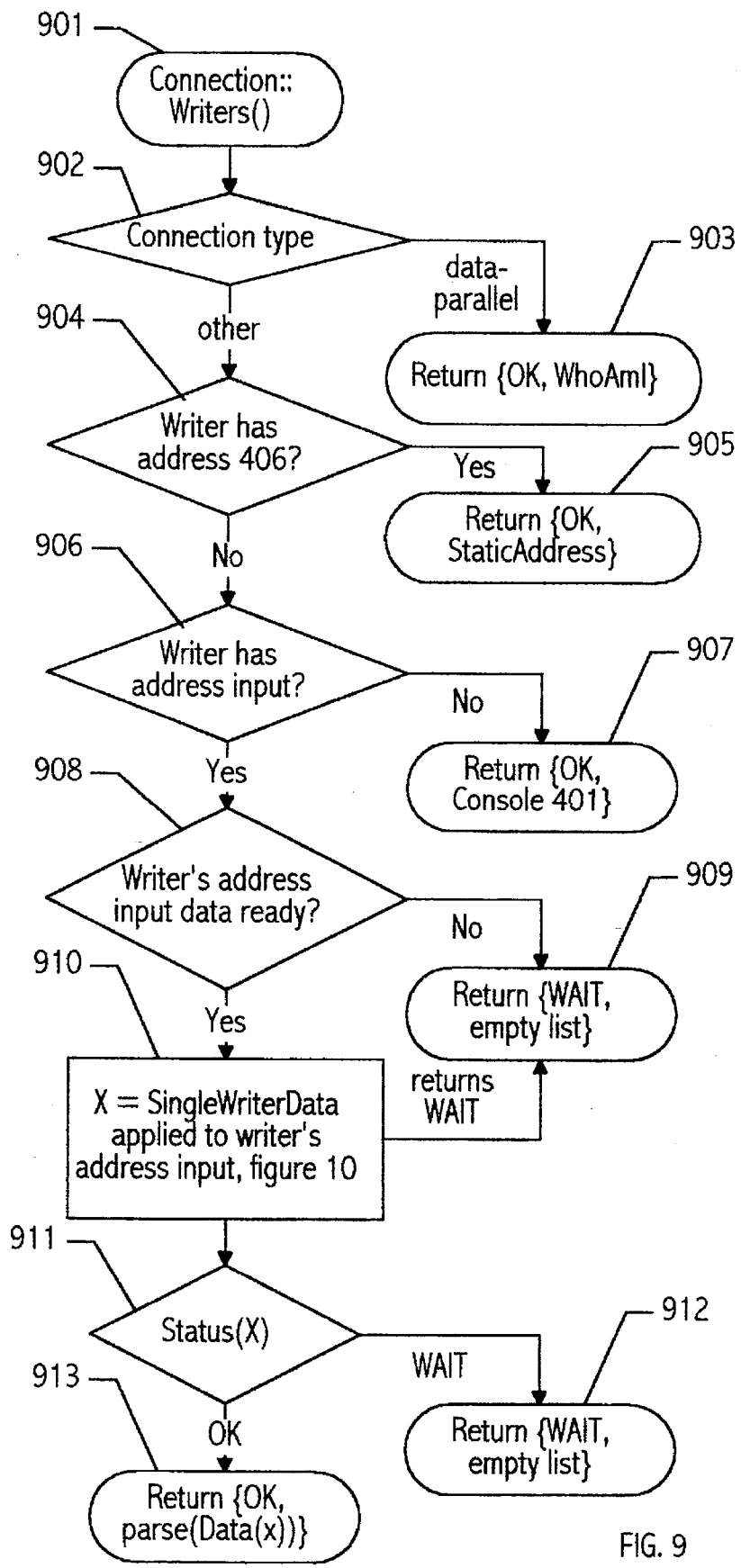
FIG. 9 shows a helper process to determine writers of a connection according to the invention.

The helper process described in FIG. 9 returns a list of addresses of computers that are supplying data to a connection. This process is used later when a task needs to know where to get input data. The process executes on one computer and returns the list of computers sending data to that computer only. If the list of addresses cannot be determined, the process returns an empty list a WAIT indication.

Subroutine Writers is dual-valued, returning data of the form {status, list}, where status is from the set OK and WAIT, and list is a list of addresses. Control enters at block 901 with implicit reference to a connection, i. e. the flowchart has access to data in one connection 403 and variables in Table III. Conditional 902 follows the data parallel branch if the tasks at both ends of the connection are data parallel. Block 903 returns the name of the currently executing computer since data parallel connections are always written and read on the same computer. Function WhoAmI represents the function that gets the computer's name from the operating system.

The following logic makes use of the fact that a task may not be statically and dynamically addressed at the same time.

Conditional 904 tests to see if the writing task has a static address. Block 905 returns the static address. Conditional 906 checks to see if the writer has a connection to its address input. The lack of an address input here indicates the task has neither a static address nor an address input. Block 907 returns the value of the Console variable under these circumstances. Conditional 908 tests the address input to see if there is data available. This test returns NO when this process is called before the writer's function supplies data to the connection.

Block 909 returns WAIT to indicate that the process cannot determine the writers and must be called again. Block 910 gets the data from the writer's address input putting the resulting byte string in X. This uses the process in FIG. 10. Block 911 checks the status field of X. If X indicates WAIT, block 912 return this value as well. Block 913 parses the link's data into an address list and returns it.

Figure 10:
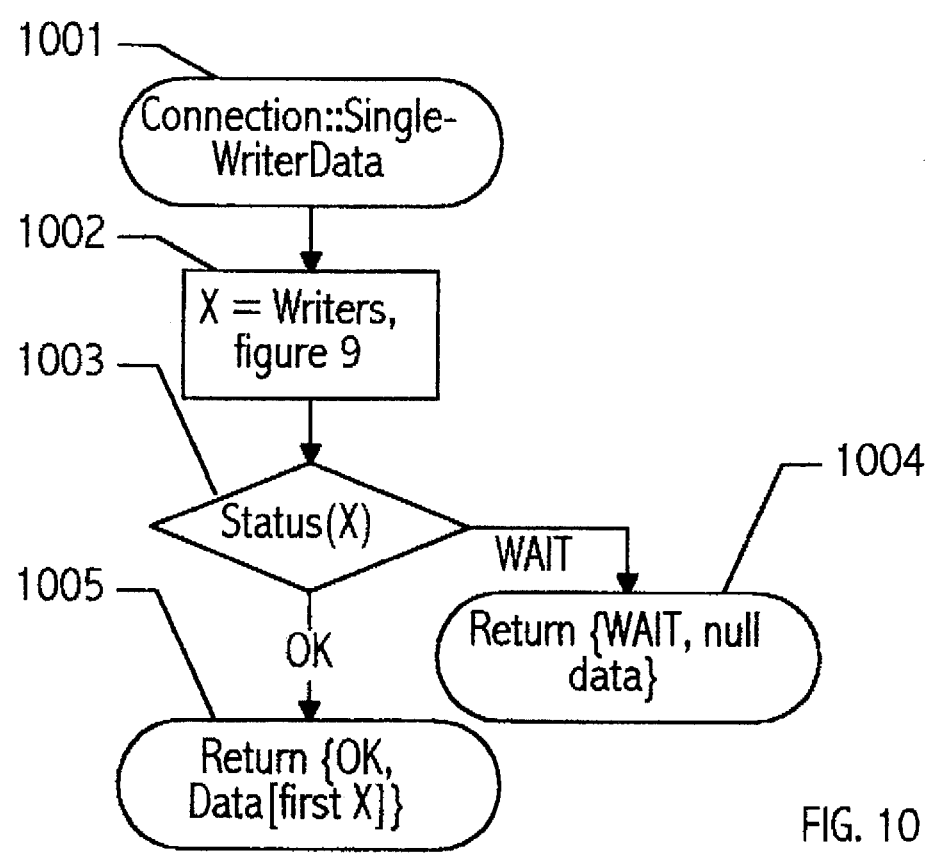
FIG. 10 shows a helper process to get data from a connection from a scalar task according the invention.

The helper process described in FIG. 10 returns data from a connection. This process assumes the connection's writing task is scalar. This process is used to get dynamic addresses as well as data from scalar tasks for subsequent use by the task's task.

Subroutine SingleWriterData returns a data structure of the form {status, data}, where status is from the set (OK, WAIT). Data is a computer data value. Control enters at block 1001 with implicit reference to a connection, i.e. the flowchart has access to data in one connection 403 and variables in Table IV. Block 1002 computes the connection's writers using the process in FIG. 9. Conditional 1003 detects WAIT return from block 912 which occurs when data is not available. Since the function cannot proceed until data is available, block 1004 returns an indication to this effect.

Block 1005 uses the first name in the list of writers as an index into associative array Data and returns the value.

The complexity in FIG. 10 arises when the task sending data is dynamically addressed. Over the course of an application's execution, the sending task may move from one computer to another. To avoid dependency on the timing of message delivery, messages from all computers should be stored separately, e.g. in an associative array Data. Block 1002 can then get the name of the current computer controlling the sending task. This name then addresses the associative array storing all the data while the flowcharts in FIG. 9 and 10 call each other, an infinite recursion never results from legal programs.

Figure 11:
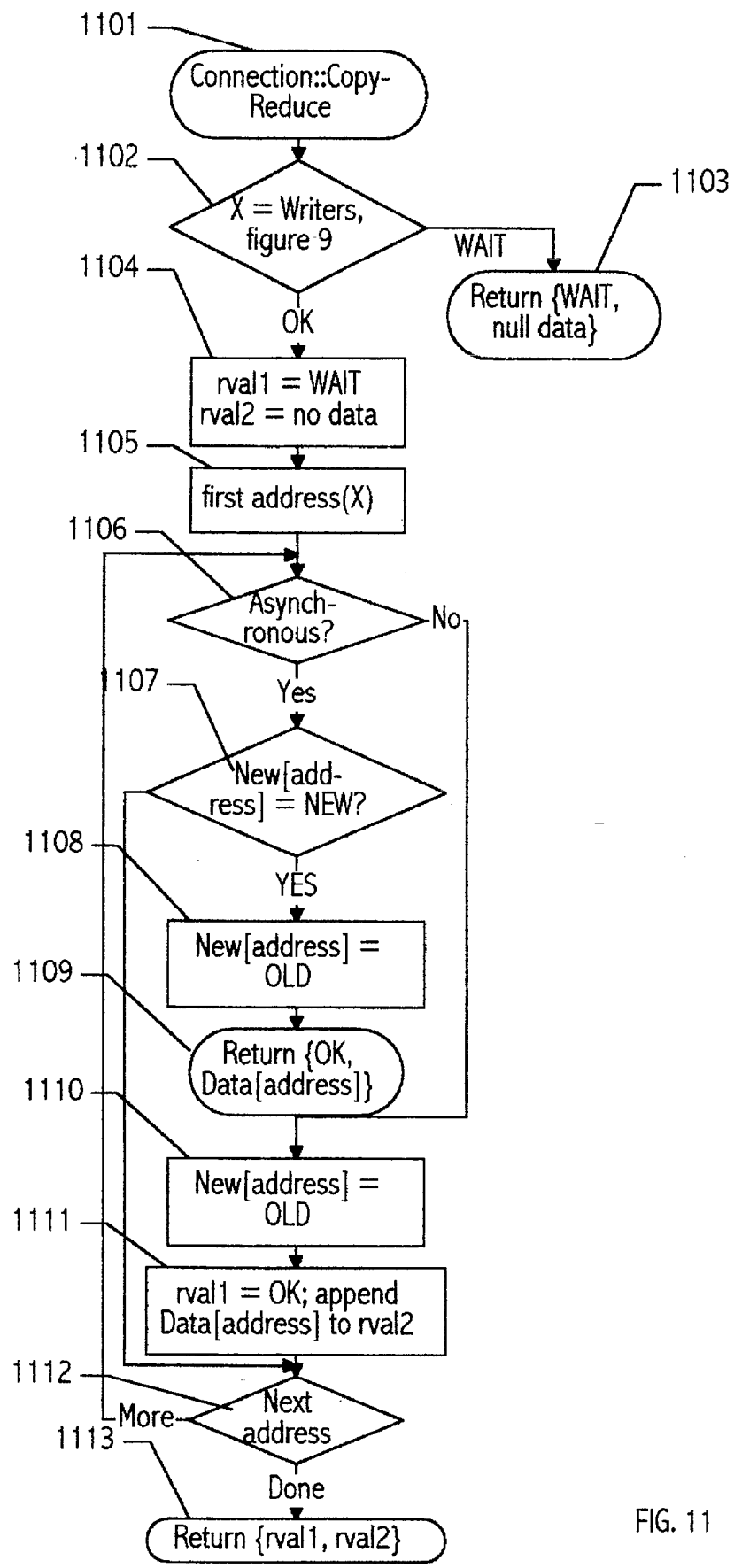
FIG. 11 shows a helper process gathering data from a connection that may be from a data parallel task according to the invention.

The helper process described in FIG. 11 returns data from a connection. This process accommodates to a data parallel writing task by reducing data parallel values to scalar via concatenation. This process is used to get data from connections prior to starting a task.

Subroutine CopyReduce returns a data structure of the form {status, data}, where status is from the set (OK, WAIT), and data is a computer data value. Control enters at block 1101 with implicit reference to a connection, i.e. the process shown in the flowchart has access to data in one connection 403 and variables in Table III.

Conditional 1102 executes the flowchart in FIG. 9, which returns an indication of success or failure and data. If the flowchart returned a failure (or WAIT) condition, control passes to block 1103 and the flowchart returns a WAIT condition. Block 1104 initializes a status variable rval1 that indicates whether any data has been found to WAIT and data variable rval2 that accumulates the returned data to empty. Block 1105 begins a loop over the list of addresses returned in 1102. Conditional 1106 branches on the state of the reader's asynchronous flag 416. If the reader is synchronous then conditional 1107 checks to see if there is new data in the connection. If the data is old, processing of data from that address ends. If the data is new, block 1108 sets the data to OLD and block 1109 returns the data with an OK indication for success.

Block 1110 gets control for synchronous readers. Block 1110 marks the data as OLD as it is being used at this point. Block 1111 updates the return value for the subroutine by setting rval1 to TRUE and appending the addressed data to rval2. Block 1112 advances to the next address. Control passes to 1113 after all data parallel sources have been scrutinized. Block 1113 returns the pair rval1 and rval2 which have been prepared by earlier steps.

The helper process described in FIG. 12 determines whether a task includes the executing computer's identity in its address. This is used to determine if a task is enabled for execution on the currently executing computer.

Control enters at block 1201 with implicit reference to a task, i. e. the flowchart has access to one task 402 and the variables in Table III. A check is first made to see if WhoAmI is in the StaticAddress list. Block 1202 starts a loop on the entries of the StaticAddress field of the task. Conditional 1203 compares the computer name with the WhoAmI function. Block 1204 return YES on successful match to indicate that the task should execute. Conditional 1205 advances the loop, branching to conditional 1206 at the end of the loop.

The process checks the address input next. Conditional 1206 checks to see if there is a connection to the address input. If there is no connection, block 1207 returns NO because there was no match in the StaticAddress field and there is no address connection. Block 1208 gets the data from the address input and designates it X. If the currently executing computer name is in this data, the task is enabled. Block 1209 starts a loop on X with conditional 1210 comparing the currently executing computer name with the loop's controlled variable. Block 1211 returns YES when the currently executing computer name is in the dynamic address. Conditional 1212 advances the loop. If the computer name is in neither the static nor dynamic lists, block 1213 return NO.

Automatic Loading of Functions

Some extensions to the automatic loading process increase the flexibility and efficiency of the invention. The goal of these extensions is to maximize the speed of executing a task's function without limiting the ability to run a task on multiple computers, including computers from different manufacturers. Two classes of steps each increase execution speed. First, the function can be compiled to the native instruction set of the underlying computer. Second, as discussed in the prior art section, many operating environments have a dynamic linking facility that allows frequently accessed programs to be loaded into memory for quick operation. Such loading increases speed.

The following process yields all the benefits just mentioned. The user specifies a task's function in a standard language with an efficient compiler. A program in a standard language provides the same results when compiled and run on any computer æ as long as the same type of computer does the compilation and running. The automatic loading process transmits the source code over the network for compilation and execution on the same computer.

To overcome the delay of the compilation process itself, the results of a compilation get saved and reused. The process involves storing compiled programs along with the source code they came from. Instead of rerunning the compiler, the stored result can just be reused.

To further increase speed, a task can load the compiler's output directly into memory the first time it gets used. Subsequent executions of the task can simply call the loaded code without either compilation or loading.

Table VI describes the various classes of source language covered by the invention. The last option yields all the benefits just described. The other options allow the invention to be used where compilers or source code are not available or the user does not know a particular language.

TABLE VI

Characteristics of different source languages

| Language Class | Content | Execution | Compilation | Data |
| --- | --- | --- | --- | --- |
| Intermediate form | Intermediate form | Run as task or dynamically link and execute as a subroutine | Compiled and cached | Either same as compiled language or a special linkage where data gets passed directly in memory |
| Program | Object code | Run as task or dynamically link and execute as a subroutine | None | Either same as compiled language or a special linkage where data gets passed directly in memory |
| Interpreted language (i. e. Basic, D18 Batch script) | Source code | Run interpreter as task with source code as input | None | $1–$12 in source code get replaced by temporary file names, $a and $b in source code get parameters |
| Compiled language (i. e. C, C++) | Source code | Run compiled program as task | Compiled and cached | The command line gets the names of temporary files, $a and $b in source code get replaced by parameters before compilation |
| Compiled language with DLL linkage (i. e. C++ DLL) | Source code to DLL interface | Dynamically linked and executed as a subroutine or task | Compiled and cached | Either same as compiled language or a special linkage where data gets passed directly in memory |

The invention also provides a process to protect the security of source code. In this process, a software developer creates tasks using a compiled source language. The process changes the Intertask representation by compiling the source code to object code and changing the tasks to run the object code instead of compiling and running the source. This preserves the flexibility of a developer changing source code and seeing the result immediately, yet the changed Intertask representation secures the source code from pirating.

Use of a compiler that generates an instruction-set independent output can improve the previous method. The improved method changes the Intertask representation by compiling the source code to the instruction-set independent output, replacing the source code in the tasks with this output. If the intermediate form is of the interpreted variety, such as P-13 code—see, for example Visual C++, the task changes to an interpreted language type.

An intermediate form of a different variety requires a compiler itself. In this case, the task changes to a compiled language type, i.e. the compiled language entry in Table VI, producing a second compilation to a specific instruction set. This method not only protects the source code from pirating, but also permits the Intertask representation to run on computers with different instruction sets.

The invention takes advantage of dynamic linking if it is available. Some computer operating systems make it possible for a running program to load specially prepared program fragments and later execute them within the same program. This increases speed by skipping the loading process for the second and later invocations of a program and for unused programs. The term Dynamically Linked Library (DLL) sometimes applies to these programs. The running program that accesses such a program fragment makes an operating system call with the name of the desired fragment. The operating system returns a data that is referred to herein as a program handle. The running program uses this handle to call the desired function as a subroutine. For more information refer to Microsoft's (Redmond, Wash.) Visual C++, which includes the software development kit for Microsoft Windows.

Conveying Data to Tasks

The invention uses two methods of conveying data to and from a task during execution.

One method uses temporary files. In this method, input data gets written to files before a task starts and temporary files get read after the task completes. The task read and writes the files. The names of temporary files get communicated to the task by different methods depending on the source language. For languages without a compiler, the temporary file names can be substituted into the source code directly. While this method works for compiled languages, it changes the source code each time and mandates recompilation. Compiled languages thus convey the temporary file names via an input to the compiled code, such as the command line.

The second method transfers data via data structures in memory. The second method works for dynamically linked libraries, since tasks cannot receive data via memory.

The exemplary embodiment of the invention replaces character sequences $1–$12 in source code with temporary file names corresponding to the like-numbered tie points, where appropriate per Table VI. The preferred embodiment has additional parameters $a and $b that can be set by steps at the option settings level. The values of these parameters get substituted into the source code.

The exemplary embodiment of the invention checks correspondences between connections and source-code substitution as an aid to the user. Specifically, steps verify that each connection 403 corresponds to data accessed by the source code per Table VI and vice versa. The following example from the illustrates this checking.

Data is passed to and from C programs by files whose names appear on the command line that invoked the program. The file names on the command line can be accessed in the program through an array called "argv." The process verifies that each connection 403 corresponds to a character sequence "argv[n]," where n is the tie point number. This algorithm is a heuristic because it does not detect "i=n; argv[i]" and falsely detects "argv[n]" in a comment, even though commented code has no effect. Such a heuristic nevertheless protects skilled programmers from inadvertent mistakes.

FIG. 13 details the exemplary process for executing a task. The process starts when events are available for all the task's inputs. The task's source code and source language are available. Hard disk is used to store source code and its compiled equivalent. Control enters at block 1300 with implicit reference to a task, i.e. the flowchart has access to one task 402 and the variables in Table III.

Block 1301 copies input events from event lists in connections to internal buffers associated with the task. If the connection reduces an output from a data parallel task, step 1301 converts the data by concatenation, or another reduction method. Block 1302 substitutes values for formal parameters in the source code. The specifics of the substitution depend on the source language are as described in Table VI. The substitution changes the source code for further use in this flowchart, but does not change source code 405. Block 1302 performs a heuristic to assure that the task has the required connections. Conditional 1303 checks to see if a compilation is needed. If the specified source language is not compiled as elaborated in Table VI, this check returns "no."

Block 1304 applies a hash function to the source code, as modified by substitution of formal parameters. Hash functions are well-known and not elaborated further here. The output of the hash function gets converted to a file name. Conditional 1305 checks to see if execution is in the form of a dynamically linked library. This check returns Yes based on the characteristics of the source language as elaborated in Table VI. Conditional 1306 checks to see if a dynamically linked library is loaded for this task and that its file name is the same as produced in block 1304. A Yes from this check indicates that recompilation is not necessary and control passes to 1311. Block 1307 unloads the dynamically linked library, if loaded, as the source code has changed since it was loaded and needs to be replaced. Conditional 1308 checks to see if the source code produced in block 1302 and its compiled form are present on the disk. This conditional returns Yes if the hashed filename produced in 1304 exists in a particular directory designated for stored source code and a byte-by-byte comparison of the stored program and the source code produced in block 1304 reveals that they are identical to preclude different programs that produce the same hash value.

Block 1309 launches the compiler. The specific compiler and compilation options depend on the source language as described in Table VI. The compiler may be launched as separate task. Block 1310 executes other process steps while the compilation task completes. Conditional 1311 checks to see if the source language specifies a dynamically linked library. Conditional 1312 checks to see if a dynamically linked library with the name produced in block 1304 is currently attached to the task. Block 1313 loads the dynamically linked library. Conditional 1314 checks the language type to see which type of input/output connection applies. Block 1315 writes temporary files, knowing that this type of connection is appropriate. Block 1316 forms a command line for the task. The specifics of the command line depend on the source language as described in Table VI.

Block 1317 starts the task. Depending on the source language, this may either be a subroutine call or launching a task. Conditional 1318 checks the source language to see if a dynamically linked library connection applies. Block 1319 executes other process steps while task execution by a independent task completes. Conditional 1320 checks the language type to see which type of input/output connection applies. Block 1321 reads temporary files from the disk, knowing the file of connection applies. Block 1322 resets associative array Sent to indicate that all entries need retransmission.

Execution completes at 1323.

Field Changes

As mentioned above, the invention presents a single group of process steps for both creating a network application and maintaining or modifying it after creation. This means that process steps used by the skilled user to control the function and appearance of the application at a gross level are available to the novice user. To the novice user, these steps affect minor variations in the behavior of the application. This distinction in the intent of process steps may be enforced by other process steps. These additional steps use a security mechanism to identify whether the user is authorized to make gross or minor changes.

When a user authorized only for minor changes attempts a gross change, the change gets rejected. This concept extends to any number of levels. Process steps get classified according to the amount of change the steps can make to an application. Users receive authorization to use or not use steps from each class for a particular application.

The description below describes two groups of process steps called option settings and constrained replacement. Each of these groups may be enabled independently of each other and of the ability to change the application in a gross way.

Option Settings

The invention includes steps that let the novice user set parameters within a network application. Since the goal of the option settings grouping is to give novices control over the application, none of these steps may require programming skill of the user. Therefore, these are steps to be performed by the computer given only the Intertask representation.

This procedure generates a widely-used type of dynamic dialog box. See Atif Aziz's article "Simplify and Enhance Your Application's User Interface with Dynamic Dialog Boxes," in Microsoft Systems Journal (Vol. 9 No. 3, March 1994. Miller Freeman, Inc. San Mateo, Calif.).

Figure 14:
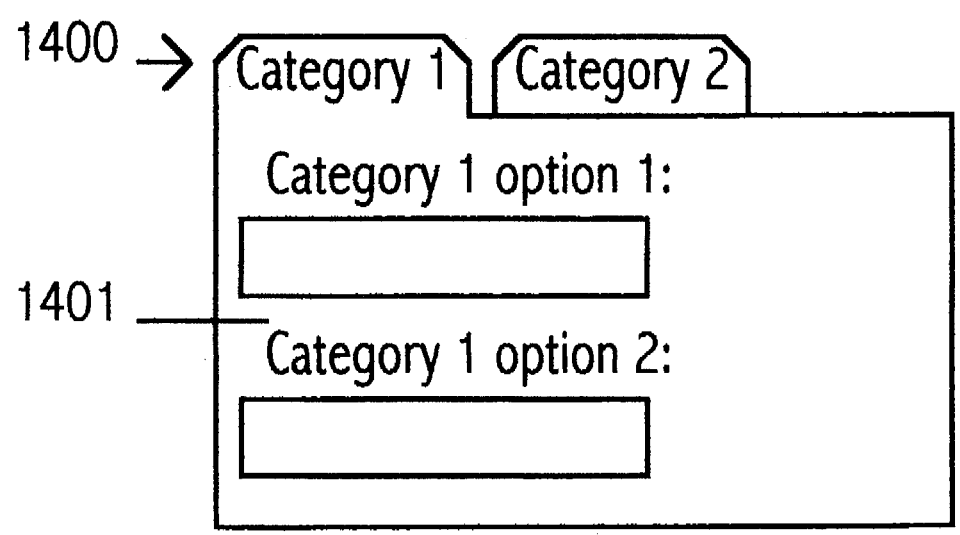
FIG. 14 shows a popular form of dynamic dialog box according to the invention.

A multi-level structure defines a dynamic dialog box. A portion of the box contains a category selector. Upon selecting a category, the remainder of the box changes to reflect options within that category. FIG. 14 illustrates a popular form of dynamic dialog box. Tabs 1400 let the user make a high-level selection of a category of options. When the user selects a category, area 1401 changes to reflect options within that category.

The invention uses properties of flow diagrams to automate the design of the dynamic dialog box. The first step in designing a dynamic dialog box is to decide how to group the parameters into categories. Humans do this by grouping logically related parameters into groups. Flow diagrams group functions and the parameters that control them into groups corresponding to the tasks they belong to. Experience shows that the flow diagram grouping fits the criterion for a logical options grouping. The invention makes an options category available for each task, while omitting tasks that would create a category with no parameters The next step assigns a name to each category and picks an order for them to appear in the higher-level selector. A human picks category names to representative of all the parameters in the category. The categories are ordered on a logical basis, such as information flow from input to output or frequency of use. A task's caption 412 represents the overall function performed by the task and makes a good heuristic for the category name. Similarly, the task's iconic graphic 411 can serve as a pictorial indication of the options category. The flow graph itself determines the flow of information from input to output in the application which makes it suitable for ordering the options categories.

Figure 15:
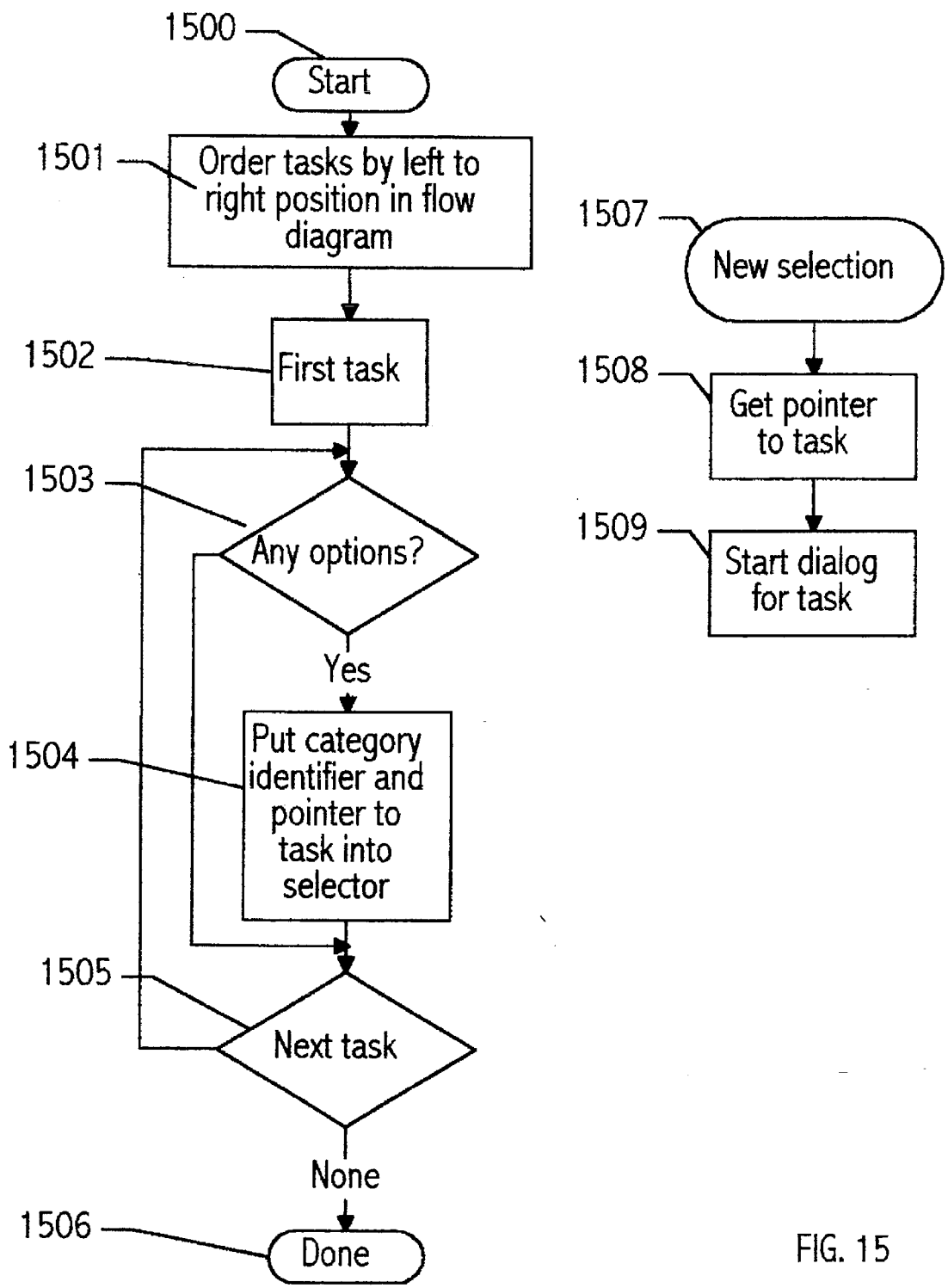
FIG. 15 shows the process for creating a dynamic dialog box according to the invention.

FIG. 15 is a flow chart of how the option settings user interface gets set up. Control enters at block 1500 when the user selects the option settings group. Sorting block 1501 converts the flow diagram into a linear order. The heuristic in the working model orders tasks based on their left-to-right position in the flow diagram. Block 1502 initializes a loop over the tasks in their sorted order. Conditional 1503 determines whether a task has any options. If a task is so simple that it has no options, the process avoids cluttering the dialog by skipping the category altogether.

Block 1504 puts adds the category name and a pointer to the task to the selector. Conditional 1505 advances to the next task, completing the flow chart at block 1506 after the last task has been processed. When the user changes the category selection, the operating system enters the flowchart at block 1507.

Block 1508 queries the operating system for the task pointer corresponding to the selected category. The pointer entered by block 1504 is returned. Block 1509 enables the user interface for the selected task. This enabling could involve process steps that create a dialog for setting parameters or could link to a setup dialog in an external application.

Constrained Replacement

The invention includes process steps that let the novice user change the behavior of a network application in major ways. Since the goal of the constrained replacement grouping is to give the non-programmer control over the application, these steps include a fail-safe against making changes that are nonsensical. Therefore, these are steps to be performed by the computer given only the Intertask representation.

In the exemplary embodiment of the invention, an Intertask representation of the form in FIG. 4 gets augmented by a library of alternative tasks. This library may be of the form of palette 3002 in FIG. 30. The user is presented with an interface showing the tasks but not their content. The user is then allowed to replace certain tasks in the application with certain alternative tasks from the library. Upon making this replacement, the task from the library replaces the internal function of the original task but inherits its connections and other external attributes.

The exemplary embodiment of the invention controls this replacement by class parameter 417. Each task in both the application and the library gets this parameter. Replacements are allowed if the parameters are the same and rejected otherwise. The person setting up an application chooses a set of class names to permit substitutions that enhance the flexibility of the application but reject substitutions that result in a non-functional application.

UIs are able to handle commands that take two parameters through a method called drag-and-drop. In drag-and-drop, the user presses a mouse button on top of one parameter, typically represented by a graphical icon, sweeps the mouse to the second parameter, typically a position on the screen that may be blank or occupied by another icon, and releases the button. Upon pressing the mouse button, the operating system gets a data structure for the first parameter from the running application. When the mouse gets released, the program gets a data structure produced previously and the mouse position of the release.

Figure 16:
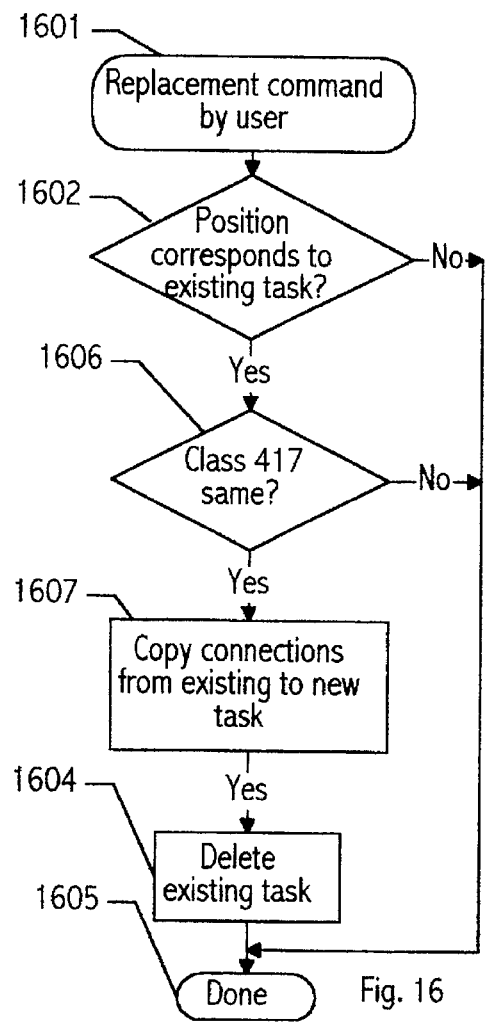
FIG. 16 shows the process for constrained replacement according to the invention.

FIG. 16 shows the process. The operating system enters the flowchart at 1601 in response to the user doing a replacement. The operating system includes data describing the replacing task and the position within the window for the replacement. Conditional 1602 does a test to see if the replacement position corresponds to an existing task. If the button were released over an empty area of the screen, there is no task to replace and the test return No.

Block 1606 compares class 417 in the two tasks and skips the replacement if they differ. Block 1603 redirects the endpoints of connections connecting to the old task to the same position on the new task. Block 1603 sets the position of the dropped task to be the same as that of the old task. Block 1604 then deletes the old task.

EXAMPLES

Overview of the Working Model's Interface

Six buttons 1701–1706 on the toolbar select the command grouping. The lower levels are oriented toward the problem being solved, i.e. the application, whereas the higher levels are oriented toward the method of solution. An authorization system can set the highest level of access for an application. Table VII summarizes the command groupings associated with each button.

TABLE VII

Command Grouping Levels in the Working Model

| Button | Command Grouping |
| --- | --- |
| 1701 | The lowest level runs the application |
| 1702 | Sets options within tasks |
| 1703 | Replaces tasks with compatible tasks |
| 1704 | Changes the application's appearance with a visual tool |
| 1705 | Changes the Intertask representation with a drawing tool |
| 1706 | Links to programming languages |

Main Window Grouping

Figure 17:
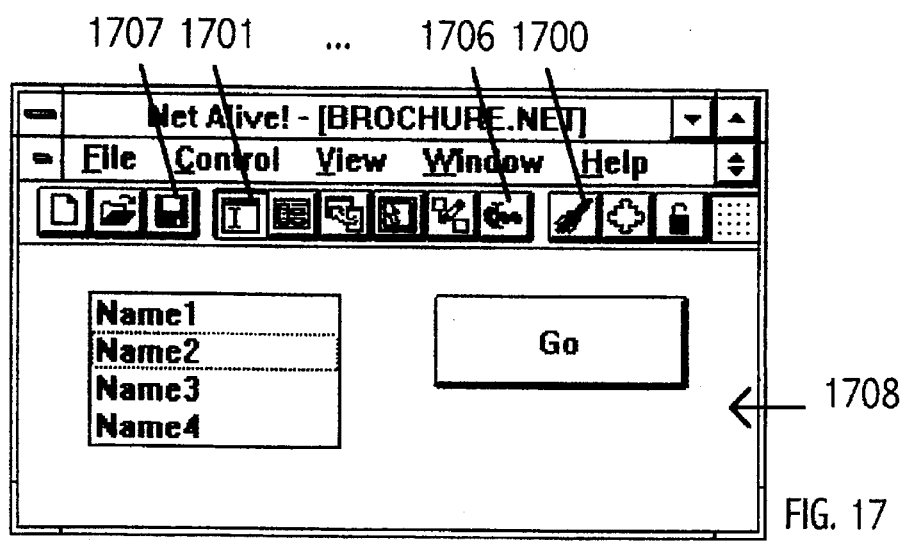
FIG. 17 shows an example of main window in working model according to the invention.

FIG. 17 shows an application at the Main Window level. Applications start this way when invoked from the program or file managers in Windows. The application looks similar to any application with a GUI, except that there are buttons 1701–1706 on the toolbar to change to other levels. The figure shows an application created with the exemplary embodiment of the invention. The application's creator started the working model with any empty main window 1708. They then used higher level commands to draw the application's screen and specify its function. They then "saved" the setup using button 1707 in an application file.

Option Settings Grouping

Figure 18:
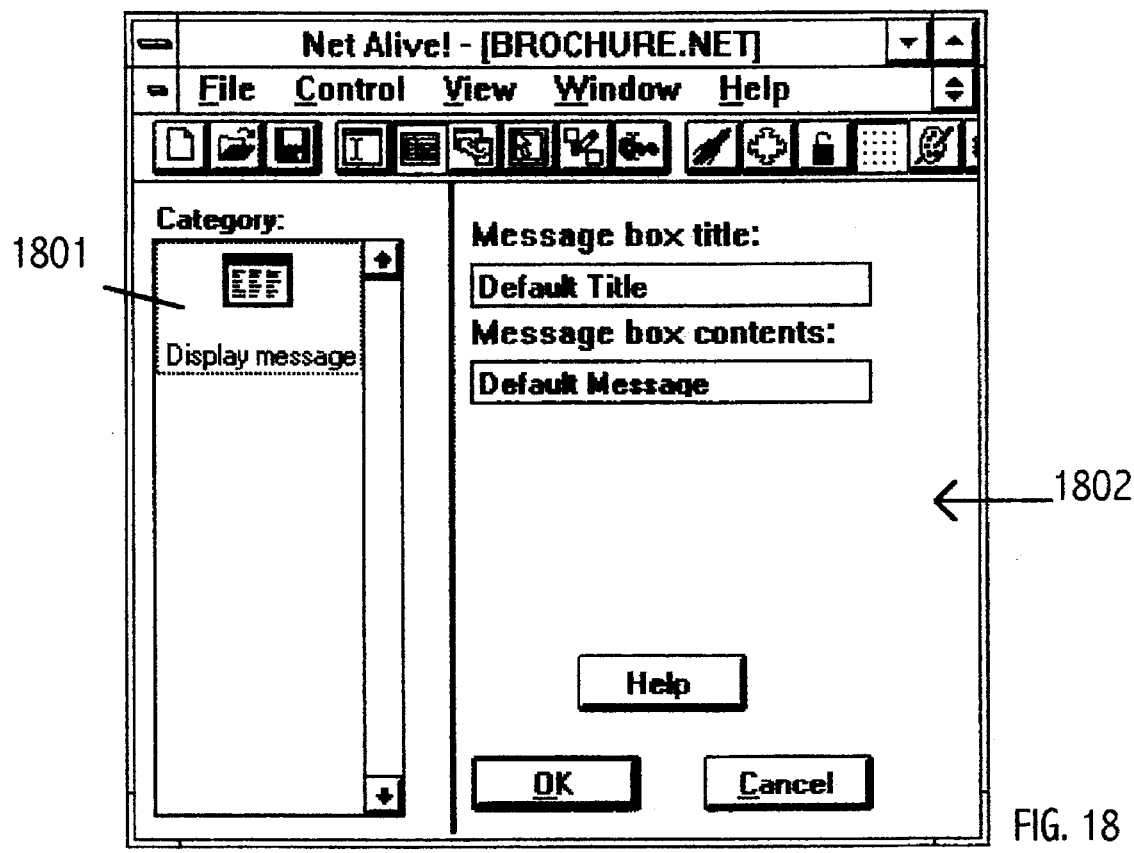
FIG. 18 shows an example of option settings in working model according to the invention.

FIG. 18 shows an application at the Option Settings level. The creator of a typical application disables this level for end-users but not for others. If authorized, a user enters this level by clicking the options button 1702 on the toolbar. The option settings level displays category selector 1801 generated according to FIG. 15. Upon selecting a category, dialog 1802 changes to reflect changeable options in that category. If the application uses external, e.g. legacy, applications, icons for those applications may appear in the category selector and a configuration dialog for that application appears in the dialog. All programs have a category selector 1801. Higher-level commands control the selector's icons and headings. Higher-level commands customize the content of dialog 1802.

Task Connections Grouping

Figure 19:
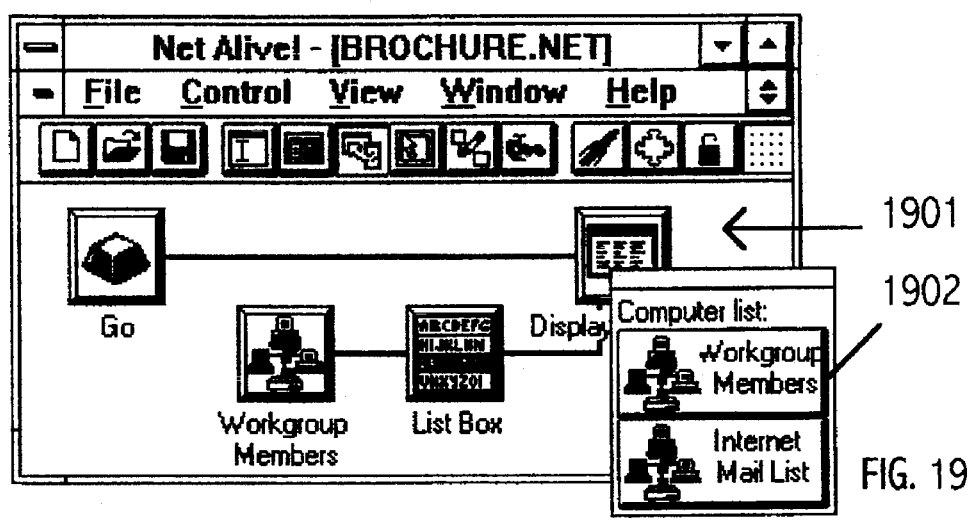
FIG. 19 shows an example of task connections in working model according to the invention.

FIG. 19 shows the working model at the Task Connections level. The task connections level lets tasks be replaced with compatible ones. This level displays the application's Intertask representation 1901 in the main window. Intertask representation 1901 shows the tasks and the flow of data between the tasks with lines. Palette 1902 has tasks that may replace tasks in the flow diagram in accordance with FIG. 16. These replacements are done by dragging a task from the palette and dropping it over a compatible task in the flow diagram. The graphic on the tasks indicate which replacements are allowed, with improper replacements rejected.

All network applications have an Intertask representation 1901 and palette 1902. Higher level commands create the specific Intertask representation and palette entries. Higher level commands control which palette entries may be dropped on which tasks in the Intertask representation via class 417, thus forming a fail-safe against replacements that might introduce bugs.

Edit Main Window Grouping

Figure 20:
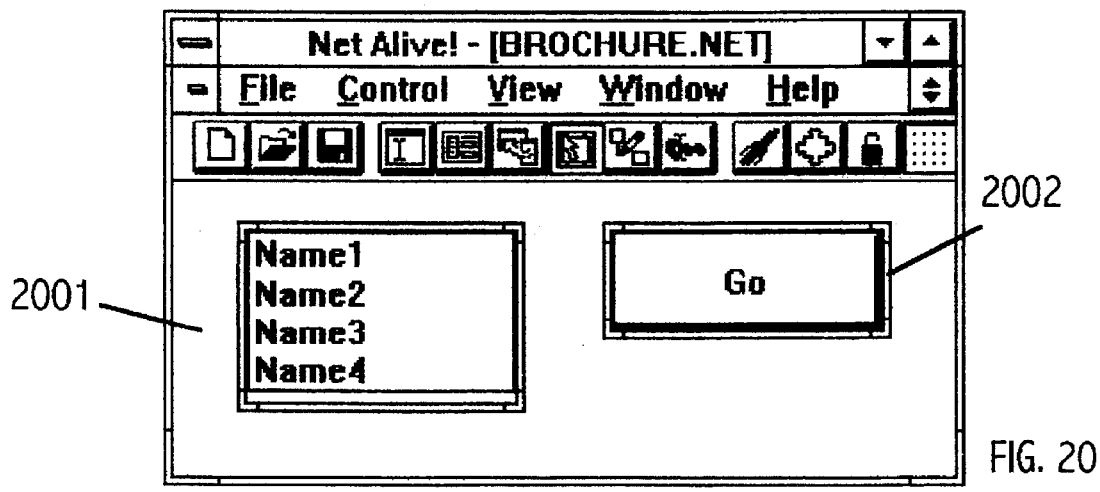
FIG. 20 shows an example of GUI builder in working model according to the invention.

FIG. 20 shows an exemplary Edit Main Window level. The edit main window level shows the main window in FIG. 17, except with a grid 2001 and resizing border 2002 around each widget. The process creates an initial main window from the flow diagram. The initial window places the application's widgets in the same positions as the tasks that represent their function. This level lets the user adjust the initial window, with the adjustments becoming graphics position 409.

Edit Task Connections Grouping

Figure 21:
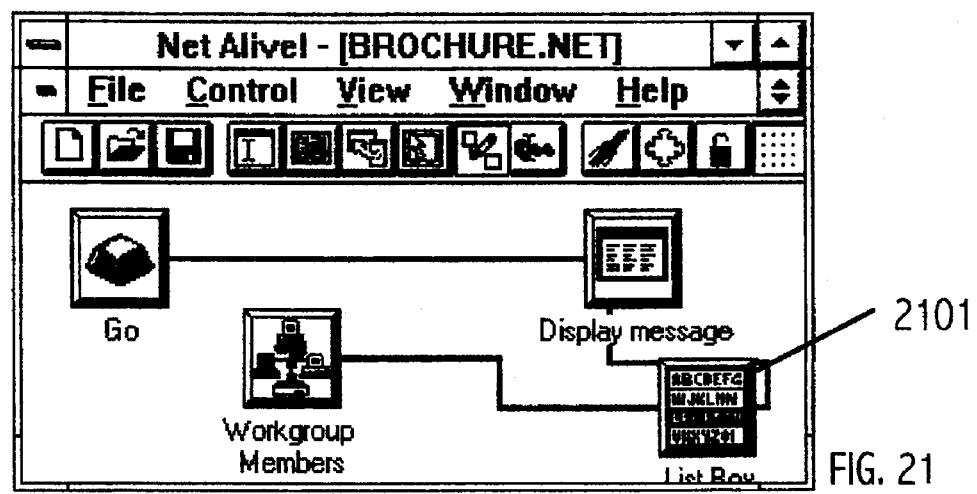
FIG. 21 shows an example of task connection's editor in working model according to the invention.

FIG. 21 shows Net Alive at the Edit Task Connections level. The edit task connections level displays the Intertask representation like the task connections level, but with a grid superimposed. This level lets the user add tasks by dragging tasks from the palette and dropping them on an empty part of the screen. The user makes new connections by sweeping the mouse, with the process choosing the shape of the line to maintain an orderly display. The user may move tasks to maintain an orderly display and may move and delete connections to change the function.

Task Source Code Grouping

Figure 22:
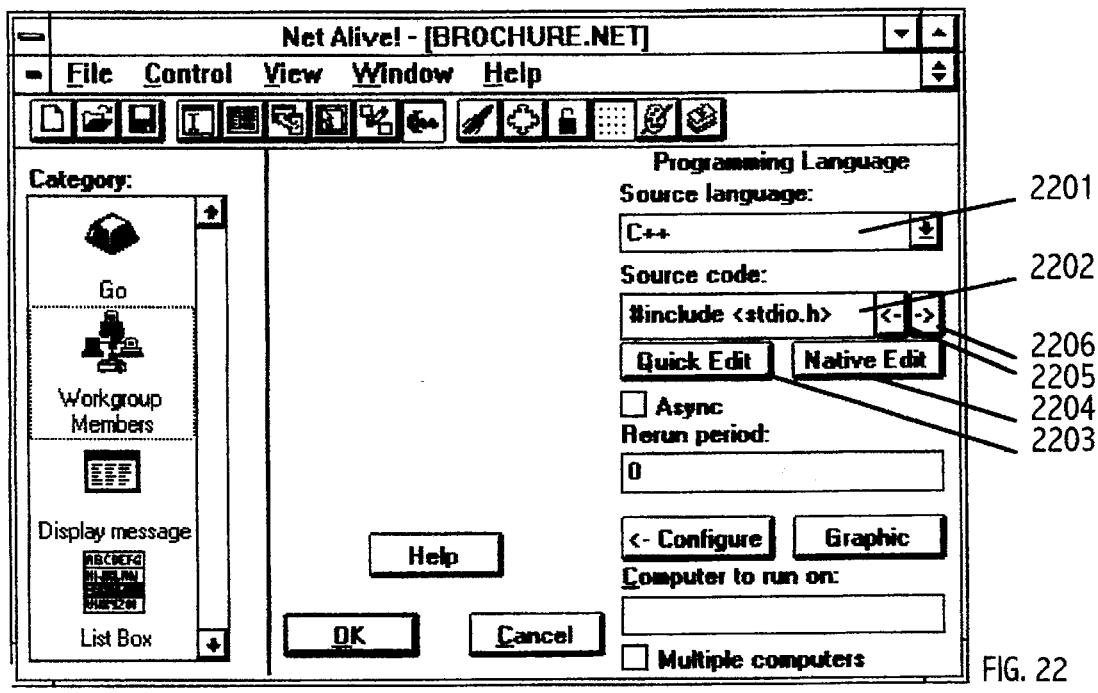
FIG. 22 shows an example of source code editor in working model according to the invention.

FIG. 22 shows the Task Source Code level of the exemplary embodiment of the invention. The dialog in FIG. 22 lets the user control both the functions of the task and its appearance in the Intertask representation. By appropriately selecting source language selector 2201, the contents of source code display 2202 are interpreted in various languages. Pressing quick edit button 2203 displays the source code in a resizeable edit window, whereas source code display 2202 shows only the first line.

Alternatively, native edit button 2204 links to an external program for editing. For example, the Visual C++ program, or a competitor, may be used for editing a C++ program. The process extends on source code 405 in a straightforward manner and specifies source code 405 as a list of data sets. This better accommodates program fragments that are large programs by letting them be specified in multiple files. Buttons 2205 and 2206 shift source code display 2202 forward and backward along this list.

By selecting the "Graphic" button, the operator can change the icon and caption that appears in category identifier 1801. The "ConFIG." button lets the operator change headings and queries that appear in the options settings screens.

Setting Up a Simple Application

This section shows the construction of a very simple network application. This application runs the MS-DOS directory-listing command on two computers and displays the combined result. The display are in a list box in the application's main window. To draw a distinction between the invention and client-server systems, the display is on a workstation different from the one where the application starts. To highlight field-changeability, the application is then changed to sort the files before display.

Figure 23:
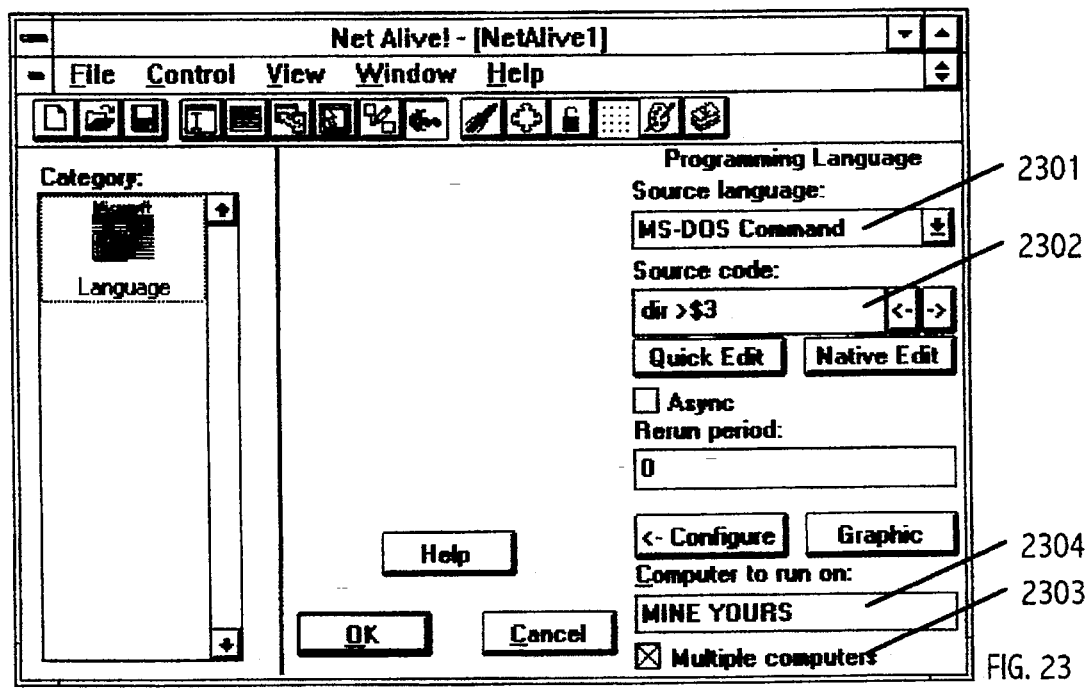
FIG. 23 shows the creation of a language task according to the invention.

The application's creator starts the process with an empty window and goes immediately to the Edit Task Connections level. The initial application consists of two tasks, i.e. a task to encapsulate the directory command and another task to display the result. Because there is no task for doing directory commands in any predefined palette, the creator must make this task from scratch. This requires the following steps:

Three mouse clicks create an "empty" task of the "programming language" type. Refer to FIG. 23.

Source code selector 2301 then gets set to MS-DOS command and source code "dir>$3" gets typed into source code box 2302.

Multiple computers box 2303 gets selected and the names MINE and YOURS get typed into computers to run on field 2304. MINE should be the name of the creator's computer and YOURS is another computer.

The creator changes the working model to the Edit Task Connections level and activates the palette.

The user drags a task for a list box onto the main window and drops it.

Figure 24:
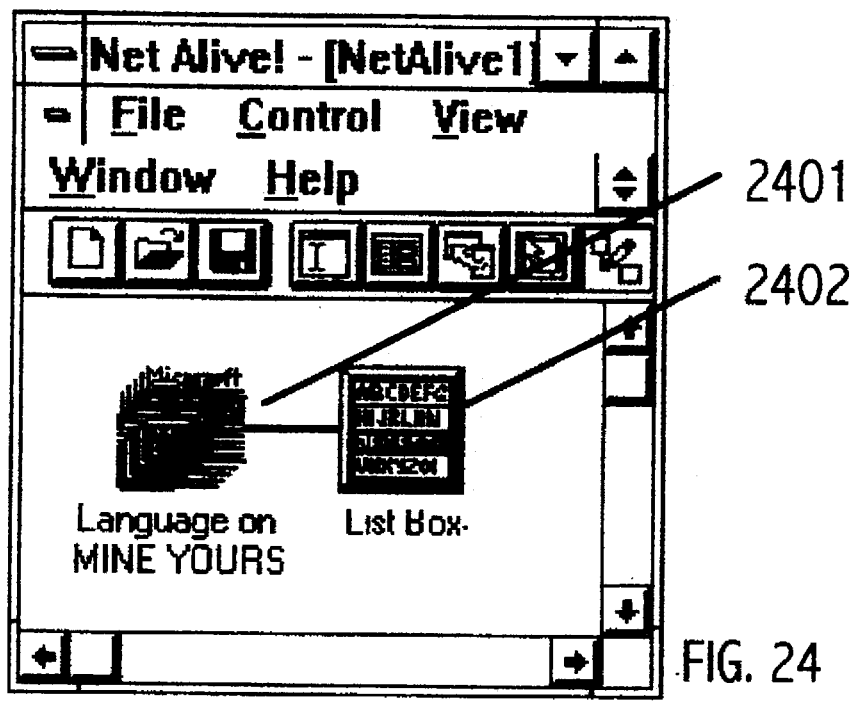
FIG. 24 shows the connection of two tasks according to the invention.

The tasks get connected by sweeping the mouse, yielding the screen in FIG. 24. The connection points to language box 2401 is at the 3 o'clock position, which corresponds to the $3 typed earlier.

The user double clicks on list box 2402 and gets a dialog and types YOURS into a computer to run on field (not shown).

Clicking the run button 1700 starts the application. After a few seconds, the output appears on computer YOURS in a list box window having the same size and position as the list box icon.

Figure 25:
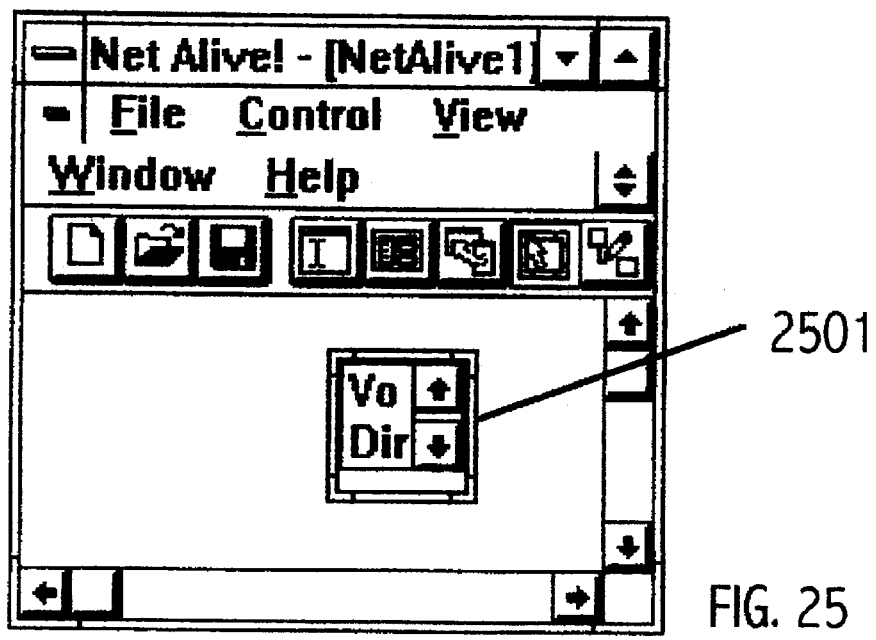
FIG. 25 shows a window in preparation for resizing according to the invention.

The user switches to the Edit Main Window level and sees the screen in FIG. 25.

The user resizes window 2501 shown in FIG. 25 for an aesthetic appearance.

To illustrate field-changeability, the problem definition now changes to displaying the files in sorted order. The user shifts to the Edit Task Connections level and deposits a predefined sorting task 2601 onto the screen and connects it into the middle of the flow diagram. The resulting flow diagram is shown in FIG. 26.

Figure 27:
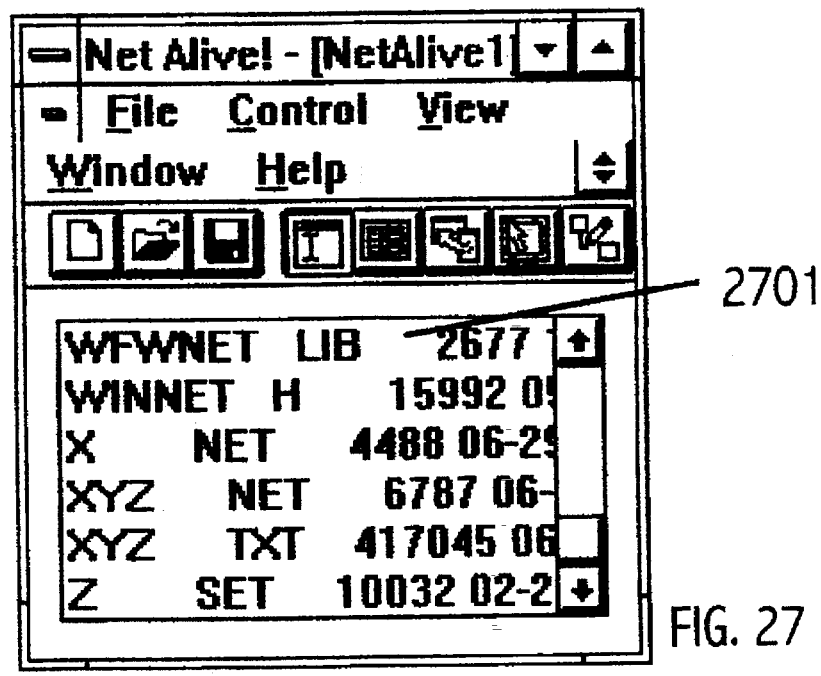
FIG. 27 shows the completed application according to the invention.

A few seconds after pressing run button 1701, computer YOURS displays list box 2701 with sorted files. The list box can be scrolled as shown in FIG. 27.

Save button 1707 saves the configuration into a file. This file can be connected to a program manager icon if desired.

Figure 26:
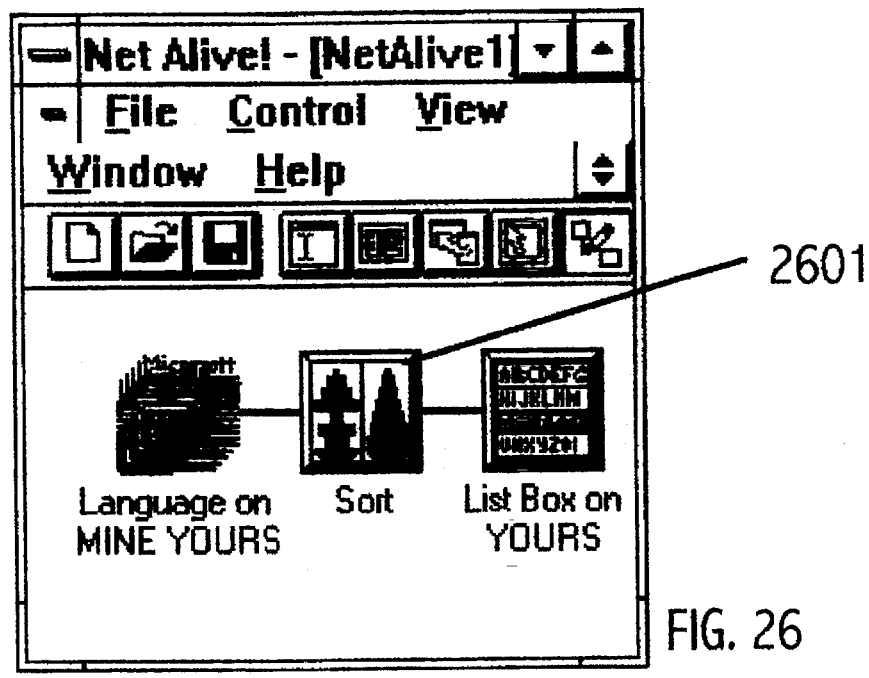
FIG. 26 shows the editing of a flow diagram according to the invention.

FIGS. 24 and 26 illustrate a labor-saving feature of the working model. The automatic installation feature in FIG. 8 only runs in response to a message transmission. Since task 2401 has no inputs, the process steps in FIG. 8 never runs. A user may accommodate to this by creating and connecting a dummy task to any input of a statically-addressed task with no connected inputs. However, the working model inserts these dummy tasks automatically.

Example:

Using an Auction Application

Figure 28:
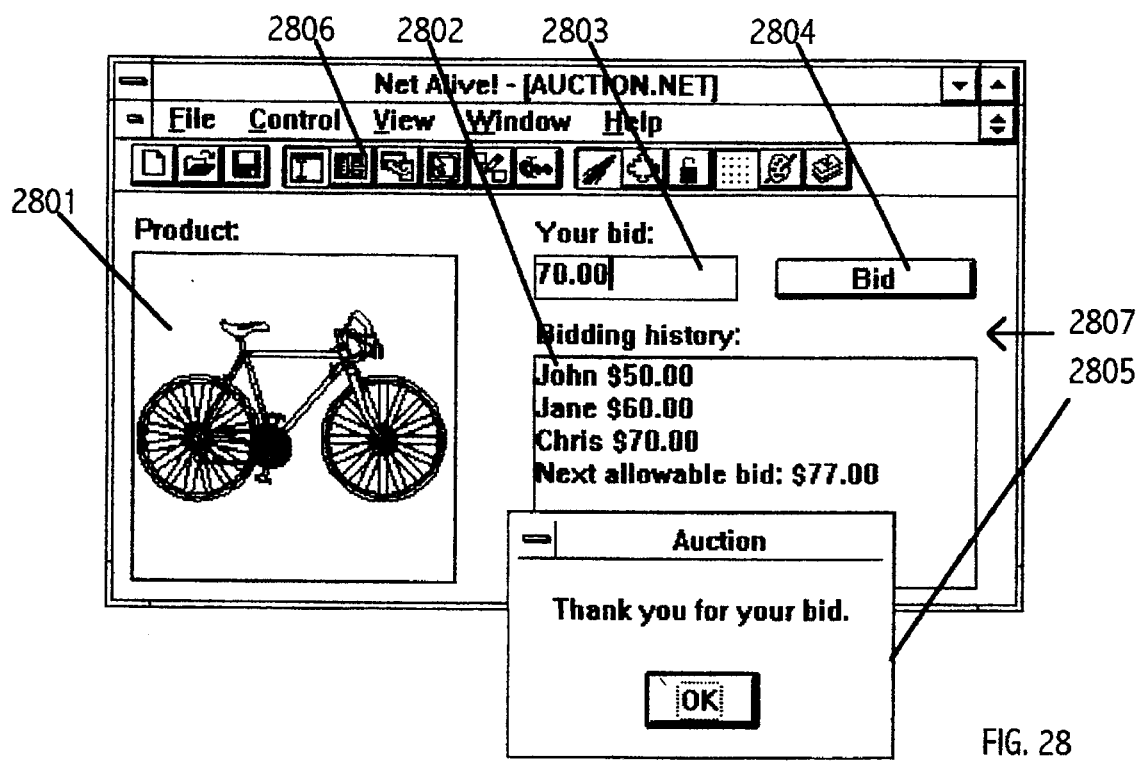
FIG. 28 shows the main window level according to the invention.

FIG. 28 shows a network application that auctions a product. Each bidder sees the screen in FIG. 28, with all the screens being tied together into a multi-user network application. The screen shows a graphic 2801 to remind the bidders of the product auctioned. Each bidder watches bidding history box 2802, which updates in real time. A bidder submits a bid by typing a number into text box 2803 and pressing button 2804. Confirmation message 2805 indicates acceptance but would indicate rejection if the minimum bid advance had not been met. Button 2806 leads to the working model's presentation of the "option settings" level.

Figure 29:
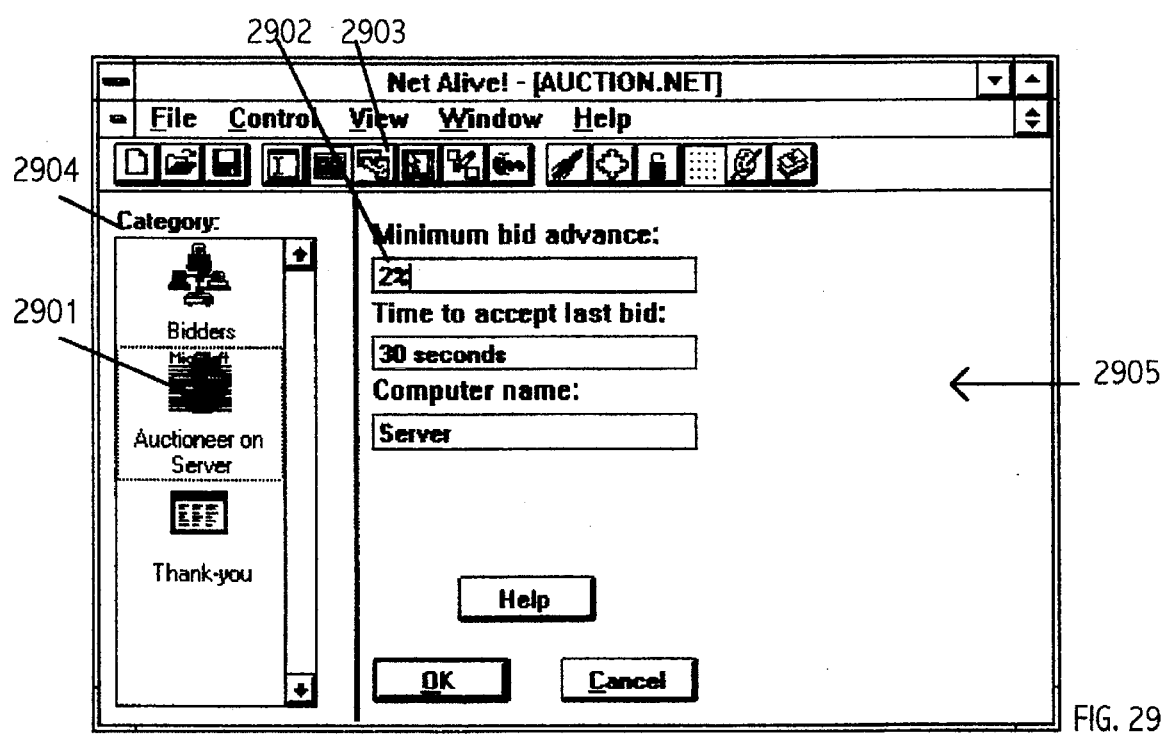
FIG. 29 shows the option settings level according to the invention

FIG. 29 shows how the working model presents the process steps in the option settings level. This user may have used the screen in FIG. 28 and not gotten satisfactory results. For example, the bidders complain that a 10% minimum advance is too large. The user is then motivated to try commands checking for correct setup. They discover and press button 2806. There is a menu entry and descriptive text that guide users to this button, but these are not shown in a printed representation of the screen. It displays the screen in FIG. 29. They select "auctioneer" category 2901 and change "10%" to "2%" in box 2902. Button 2903 leads to the "task connections" level.

Figure 30:
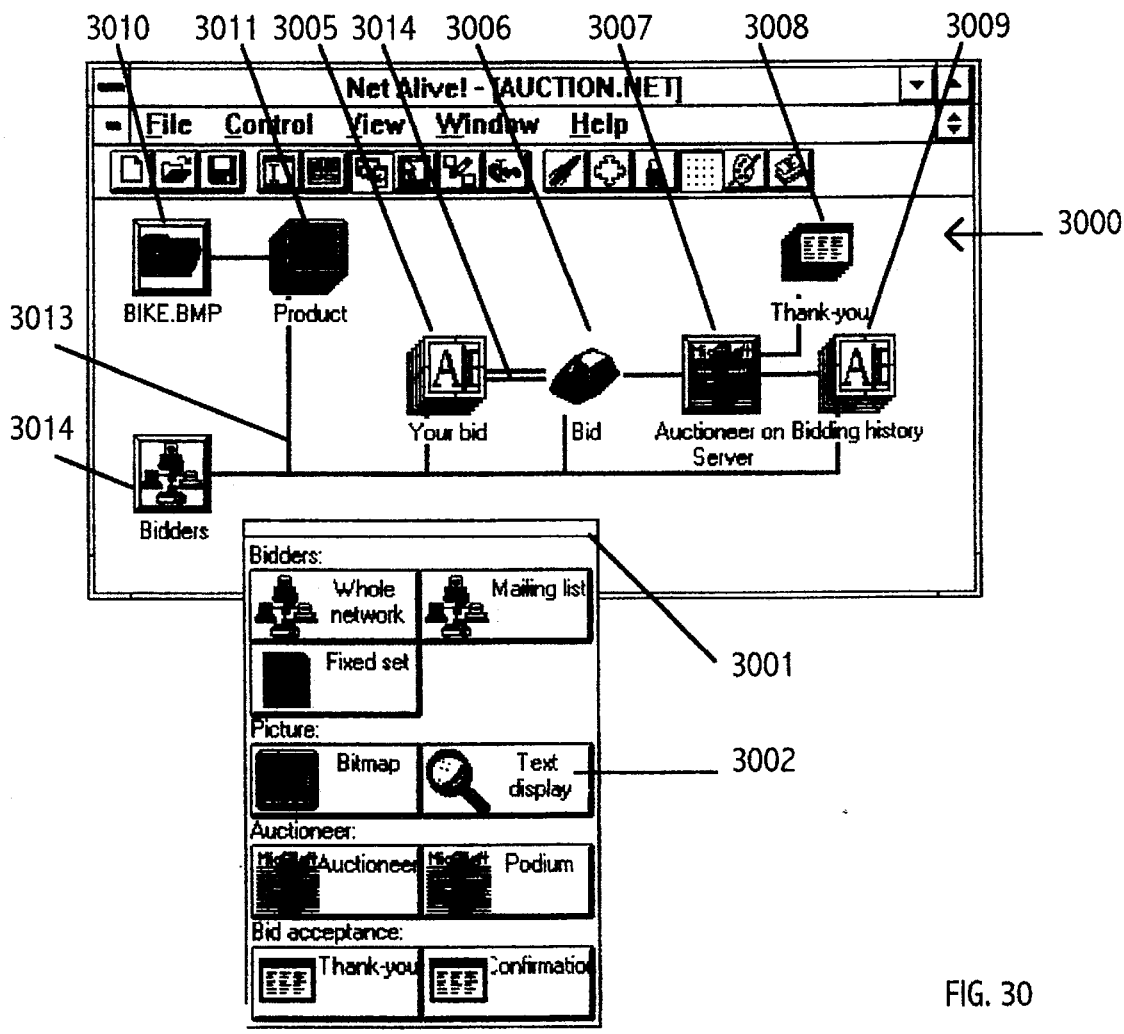
FIG. 30 shows the task connections level according to the invention.

FIG. 30 shows how the working model presents the "task connections" level. The user may have tried to install the auction application and gotten stuck. When they try the options level they discover a variety of options for displaying pictures of the product. They know they have a textual description and recall that textual descriptions shown in the product's advertising. They press button 2903 and get the screen in FIG. 30 with task connections 3000 and palette 3001. Palette 3001 includes text description task 3002. They drag task 3002 onto product picture task 3011 and drop it, replacing the task in the Intertask representation. Then they use process steps at the options level to select the text to display. Button 3004 leads to the "edit main window" level.

FIG. 30 includes an extension to the Writers variable in Table IV. The process allows multiple connections to a single output tie point. Specifically, the output of task 3014 connects to tasks 3005, 3006, 3009, and 3011. Multiple output connections replicate output data in a manner clear to a person skilled in the art. The same effect is possible by using multiple outputs on task 3014.

The tasks' layout and connection with lines show the flow of information through the application. In FIG. 30, task 3014 identifies the bidders in the auction. Tasks 3005 and 3006 display and operate widgets 2803 and 2804. Task 3007 acts as the auctioneer, processing bids and producing the bidding history and thank-you message. Task 3008 displays the thank-you message on one bidder's screen and task 3009 displays the bidding history on all screens. Task 3010 identifies the product's description and task 3011 displays it. Dragging-and-dropping from the palette replaces the component dropped on, while improper replacements are rejected. After such a replacement, the application works differently, and the categories available in category selector 2904 change.

Figure 31:
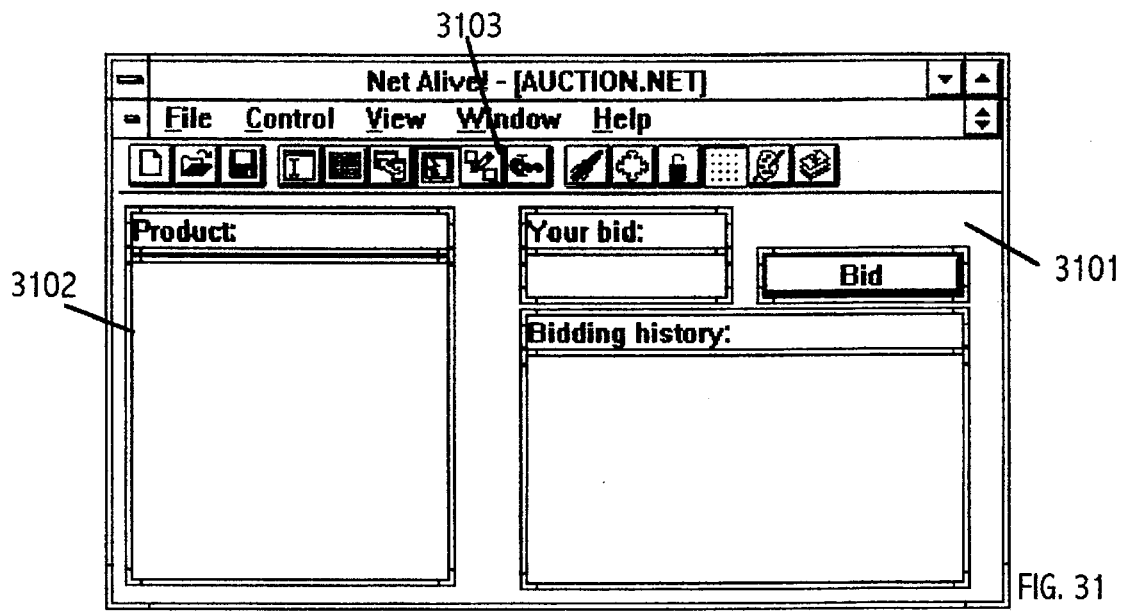
FIG. 31 shows the edit main window level according to the invention.

FIG. 31 shows how the process presents the process steps at the edit main window level. This view relates to the view in FIG. 28, except the background has a grid 3101 and the widgets have a resizing border 3102. This view lets the operator move and resize the widgets to change the appearance of the application. Button 3103 leads to the edit task connections level.

The process presents the process steps at the edit task connections level as in FIG. 30, but with a grid like 3101 superimposed. This view lets the user drag tasks from the palette and drop them on an empty part of area 3000. This adds tasks to the flow diagram. The user may also draw new connections with the mouse. Existing tasks and connections can be moved and deleted. Button 3012 leads to the task source code level.

Figure 32:
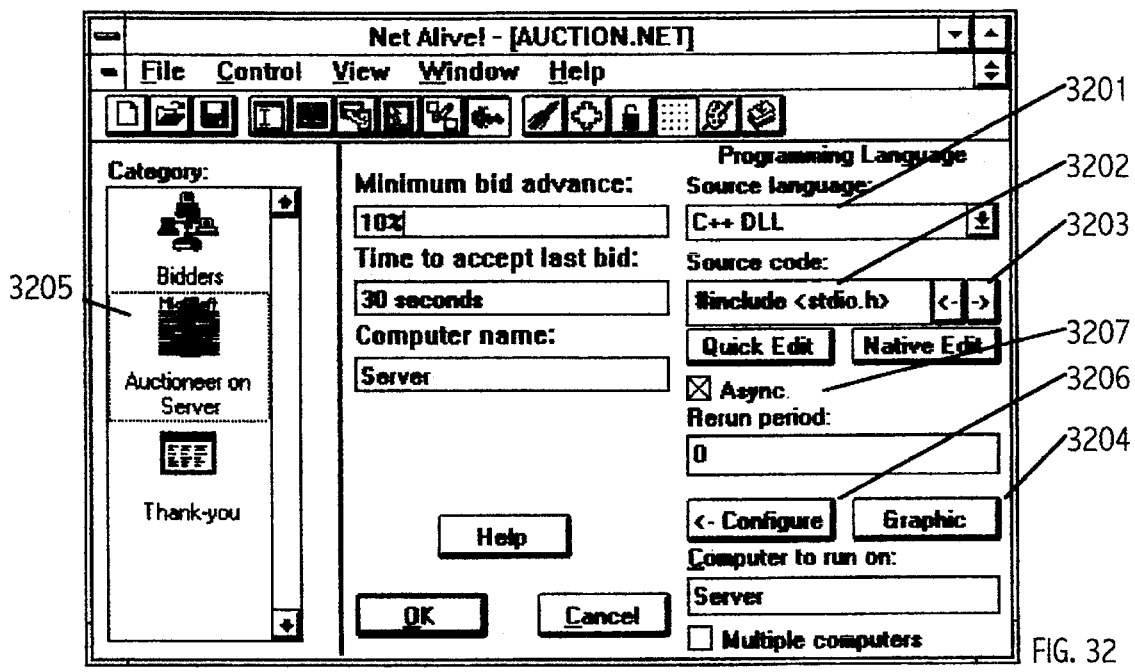
FIG. 32 shows the task source code level according to the invention.

FIG. 32 shows how the process presents the process steps at the task source code level. The screen shows the implementation of a task as source code in a computer language. By appropriately selecting the source language in box 3201 the contents of source code box 3202 are interpreted in various languages. By selecting the Graphic button 3204, the operator can change the icon and caption that appears in category identifier 3205. The <-Configure button 3206 lets the operator change headings and queries that appear in rectangular area 2905.

The most powerful process steps are indirect. The phrase "on Server" in task 3205 indicates that task executes on a computer named "Server." Connection 3013 from task 3014 to the bottom edges of tasks 3005, 3006, 3009, and 3011 causes them to run on the screens of all the bidders. Computer-operated processes use these indirect specifications of where tasks run to create a communications protocol.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. For an application in an Intertask representation, said representation including a plurality of tasks each including a Widget on an interactive display and a computer program in a general-purpose instruction-set-independent form and a plurality of other tasks each including a Widget on said interactive display, a network address, and an identifier of a second application, a recursive process for running said application on a plurality of networked computers, the network including a host computer and a target computer, comprising:

loading said application from said host computer onto said target computer;

executing said tasks on said target computer;

linking by selecting one of said plurality of tasks on said interactive display and recursively invoking said recursive process with said second application being the application and the computer addressed by said network address being the host computer; and repeating the previous two steps indefinitely.

2. The process in claim 1 which further comprises:

the computer programs are in an instruction-set-independent intermediate form derived from a general-purpose high-level language, such as P-Code;

the target computer additionally including a storage area for compiled programs; and executing further comprises if said storage area does not contain a compiled version of said computer program, then compiling said programs to the instruction set of said target computer, storing the result in said storage area and executing the compiler's result directly on said target computer's underlying hardware.

3. The process in claim 1 which further comprises:

the computer programs are in source code for a high level language;

the target computer additionally including a storage area for compiled programs; and executing further comprises if said storage area does not contain a compiled version of said computer program, then compiling said programs to the instruction set of said target computer, storing the result in said storage area and executing the compiler's result directly on said target computer's underlying hardware.

4. The process in claims 1 which further comprises:

each task and other task includes an enable-address variable containing a list of network addresses upon which this task will run and inputs and outputs;

said Intertask representation including a plurality of interconnections which interconnect inputs and outputs of said tasks in a predetermined manner;

executing additionally comprising executing each task and other task on each computer addressed by said enable-address variable and conveying data from outputs to inputs in accordance with said interconnections by sending the data over the network if necessary.

5. The process in claim 1 which further comprises:

the tasks including an identifier of the form of the computer program, the identifier including a flag indicating whether or not the computer language uses a compiler, a compilation command for executing said compiler with suitable compilation options for the form, and an execution command for running said computer program, describing the specific method of invocation and the method of supplying data to said computer program's inputs and retrieving data from said computer program's outputs;

the target computer additionally including a storage area for compiled programs; and the executing step additionally comprising the following steps if said flag is set and said storage area does not contain a compiled version of said computer program, then compiling said computer program using said compilation command, storing the result in said storage area and executing said computer program using said execution command.

6. For an application in an Intertask representation, said representation including a plurality of tasks each including a computer program with inputs and outputs and an enable-address variable containing a list of network addresses upon which this task will execute, a plurality of other tasks each including a connection to a source of trigger events, and an enable-address variable, and a plurality of interconnections which interconnect inputs and outputs of said tasks in a predetermined manner, where the manner of interconnection of the tasks is determined by the data dependencies of the application, whereby this data dependency enforces a causality on the internal operation of the application, a process for running an application defined by a data-dependency graph on plurality of networked computers comprising:

time stamping the output data of a task, where if the data is caused by a trigger event then the data is time stamped with the time of the trigger event, otherwise the data is time stamped with the latest time stamp on input data;

executing a distributed discrete-event simulation algorithm of known type, such as a computer logic simulator, to control the order of task evaluation, where tasks are equivalent to logic gates, where interconnections are equivalent to wires, where said computer programs are equivalent to said logic gate's logic function, and where the enable-address variable specifies the computers on which said logic gate's logic function will be evaluated.

7. The process in claim 6 which further comprises:

the application includes a window, a window including a display surface and an input device such as a mouse, keyboard, or pen;

said tasks include an output channel to the window; and said tasks include an input channel from the window for trigger events.

8. For an application in an Intertask representation, said representation including a plurality of tasks each having a computer program with inputs and outputs and an enable-address variable containing a list of network addresses upon which this task will run and a plurality of interconnections which interconnect inputs and outputs of said tasks in a predetermined manner, a recursive process for running said application across a plurality of computers on a network, the network including a computer, a different computer, and a receiving computer, comprising:

if said application is starting for the first time loading said application onto said computer, otherwise receiving said application from said receiving computer;

executing the tasks whose enable-address variable includes the network address of said computer if the task connects via one of said interconnections to a second task whose enable-address variable includes the network address of said computer, then the output of the task is made available to the input of the second task and if the task connects via one of said interconnections to a second task whose enable-address variable includes the network address of said different computer, then invoking said recursive process with said different computer becoming the computer and said computer becoming the receiving computer.

9. The process in claim 8 which further comprises:

said enable-address variable is selected from the group consisting of data from one of the inputs of the task and a static list of network addresses.

10. The process in claim 8 which further comprises:

said computer program is specified in a high-level language;

compiling said computer programs prior to execution.

11. The process in claim 8 which further comprises the computer programs are in an instruction-set-independent intermediate form derived from a general-purpose high-level language, such as P-Code;

executing further comprises compiling computer programs to a the instruction set of said computer and executing compiler output directly on said target computer's underlying hardware.

12. The process in claim 8 which further comprises:

said representation includes a plurality of other tasks each including a connection to a source of trigger events and an enable-address variable;

the application is defined by a data-dependency graph;

said interconnections are determined by the data dependencies of the application;

whereby this data dependency enforces a causality on the internal operation of the application;

output data of a task includes a time stamp where if the data is caused by a trigger event then the data is time stamped with the time of the trigger event otherwise the data is time stamped with the latest time stamp on input data;

executing a distributed discrete-event simulation algorithm of known type, such as a computer logic simulator, to control the order of task evaluation, where tasks are equivalent to logic gates, where interconnections are equivalent to wires, where said computer programs are equivalent to said logic gate's logic function, and where the enable-address variable specifies the computers on which said logic gate's logic function will be evaluated.

13. The process in claim, 8 which further comprises:

the application includes a window, a window including a display surface and an input device such as a mouse, keyboard, or pen;

said tasks include a means of output to the window; and said tasks include a means to receive trigger events from the window.

* * * * *